(12) United States Patent
Boivin et al.

(10) Patent No.: US 11,760,426 B2
(45) Date of Patent: Sep. 19, 2023

(54) RIBBED AERODYNAMIC SKIRT PANEL AND ASSEMBLY THEREOF

(71) Applicant: Transtex Inc., Montreal (CA)

(72) Inventors: Mathieu Boivin, Montreal (CA); Jalal Mangalo, Laval (CA); Alexandre Derny, Roxboro (CA); Sylvain Daoust, Vaudreuil-Dorion (CA)

(73) Assignee: TRANSTEX INC., Montreal (CA)

( * ) Notice: Subject to any disclaimer, the term of this patent is extended or adjusted under 35 U.S.C. 154(b) by 234 days.

(21) Appl. No.: 17/145,358

(22) Filed: Apr. 12, 2021

(65) Prior Publication Data

US 2022/0126931 A1    Apr. 28, 2022

Related U.S. Application Data

(60) Provisional application No. 63/104,227, filed on Oct. 22, 2020.

(51) Int. Cl.
    *B62D 35/00*    (2006.01)
(52) U.S. Cl.
    CPC .................................. *B62D 35/001* (2013.01)
(58) Field of Classification Search
    CPC .................................................. B62D 35/001
    See application file for complete search history.

(56) References Cited

U.S. PATENT DOCUMENTS

| | | |
|---|---|---|
| 3,470,286 A | 9/1969 | Weber |
| 3,854,215 A | 12/1974 | Foster |
| 3,885,009 A | 5/1975 | Rivat-Lahousse |
| 4,017,245 A | 4/1977 | Lang |
| 4,128,369 A | 12/1978 | Kemerer |
| 4,218,232 A | 8/1980 | Wilhelm |
| 4,335,494 A | 6/1982 | Lemelson |
| 4,417,865 A | 11/1983 | Pfeiffer |
| 4,456,571 A | 6/1984 | Johnson |
| 4,518,188 A | 5/1985 | Witten |
| 4,600,461 A | 7/1986 | Guy |
| 4,917,370 A | 4/1990 | Batts |
| 4,943,224 A | 7/1990 | Nied |
| 5,092,512 A | 3/1992 | Sturrus |
| 5,104,026 A | 4/1992 | Sturrus |
| 5,167,781 A | 12/1992 | Kemerer |

(Continued)

FOREIGN PATENT DOCUMENTS

| | | |
|---|---|---|
| CA | 2528558 | 5/2007 |
| CN | 203064061 | 7/2013 |

(Continued)

*Primary Examiner* — Lori Lyjak
(74) *Attorney, Agent, or Firm* — Benoit & Cote Inc.; Mathieu Audet

(57) ABSTRACT

An aerodynamic skirt assembly is described therein, the aerodynamic skirt assembly comprising a ribbed skirt panel with at least one rib associated with the ribbed skirt panel to alter mechanical properties of the ribbed skirt panel, wherein the rib is providing a longitudinal stiffness of a thinner ribbed skirt panel that is comparable to a thicker non-ribbed skirt panel while allowing momentarily elastic deformation of the ribbed skirt panel when the ribbed skirt panel is contacting a foreign object while returning automatically to a non-deformed configuration when the ribbed skirt panel is not contacting the foreign object.

20 Claims, 29 Drawing Sheets

(56) References Cited

U.S. PATENT DOCUMENTS

| | | |
|---|---|---|
| 5,244,618 A | 9/1993 | Kemerer |
| 5,505,599 A | 4/1996 | Kemerer |
| 5,891,379 A | 4/1999 | Bhattacharyya |
| 6,355,302 B1 | 3/2002 | Vandenberg |
| 6,455,148 B1 | 9/2002 | Spears |
| 6,701,990 B1 | 3/2004 | Burley |
| 6,932,419 B1 | 8/2005 | McCullough |
| 7,578,541 B2 | 8/2009 | Layfield |
| 7,651,645 B2 | 1/2010 | Taylor |
| 7,758,089 B2 | 7/2010 | Lee |
| 7,762,618 B2 | 7/2010 | Lewallen |
| 8,162,384 B2 | 4/2012 | Giromini |
| 8,303,025 B2 | 11/2012 | Senatro |
| 8,366,180 B2 | 2/2013 | Lee |
| 8,376,450 B1 | 2/2013 | Long |
| 8,413,937 B2 | 4/2013 | Di Franco |
| 8,579,359 B2 | 11/2013 | Brown |
| 8,636,252 B2 | 1/2014 | Pook |
| 8,678,473 B2 | 3/2014 | Dayton |
| 8,770,649 B2 | 7/2014 | Praskovsky |
| 8,899,660 B1 | 12/2014 | Praskovskaya |
| 8,973,973 B2 | 3/2015 | Kronemeyer |
| 9,132,869 B2 | 9/2015 | Dayton |
| 9,493,197 B2 | 7/2016 | Logounov |
| 9,440,689 B1 | 9/2016 | Smith et al. |
| 9,688,320 B2 | 6/2017 | Courtney et al. |
| 9,718,262 B2 | 8/2017 | Marks et al. |
| 9,908,315 B2 | 3/2018 | Speer |
| 9,919,749 B2 | 3/2018 | Baker et al. |
| 10,189,514 B2 | 1/2019 | Senatro |
| 10,343,731 B2 | 7/2019 | Emery |
| 2007/0256379 A1 | 11/2007 | Edwards |
| 2008/0116718 A1 | 5/2008 | Lewallen et al. |
| 2008/0134509 A1 | 6/2008 | Lewallen |
| 2008/0155804 A1 | 7/2008 | Lee et al. |
| 2010/0011829 A1 | 1/2010 | Truong et al. |
| 2010/0259068 A1 | 10/2010 | Lewallen |
| 2011/0204677 A1 | 8/2011 | Wood et al. |
| 2011/0233960 A1 | 9/2011 | Heinz |
| 2012/0040131 A1 | 2/2012 | Speer |
| 2013/0181477 A1 | 7/2013 | Reiman et al. |
| 2014/0028050 A1 | 1/2014 | Rodriguez |
| 2014/0159419 A1 | 6/2014 | Baker |
| 2014/0345795 A1 | 11/2014 | Speer |
| 2015/0259014 A1* | 9/2015 | Baker .................. B62D 35/001 296/180.4 |
| 2015/0375810 A1 | 12/2015 | Dayton |
| 2016/0009061 A1 | 1/2016 | Marks et al. |
| 2016/0096558 A1* | 4/2016 | Bassily .................. B62D 35/02 296/180.4 |
| 2017/0015369 A1 | 1/2017 | Senatro |
| 2017/0057563 A1 | 3/2017 | Baker et al. |
| 2018/0093719 A1 | 4/2018 | Emery et al. |
| 2018/0141302 A1 | 5/2018 | Baker |
| 2019/0118871 A1 | 4/2019 | Senatro |

FOREIGN PATENT DOCUMENTS

| | | |
|---|---|---|
| WO | WO 96/18491 | 6/1996 |
| WO | WO 2018097815 | 5/2018 |
| WO | WO 2018097991 | 5/2018 |
| WO | WO 2018152180 | 8/2018 |

* cited by examiner

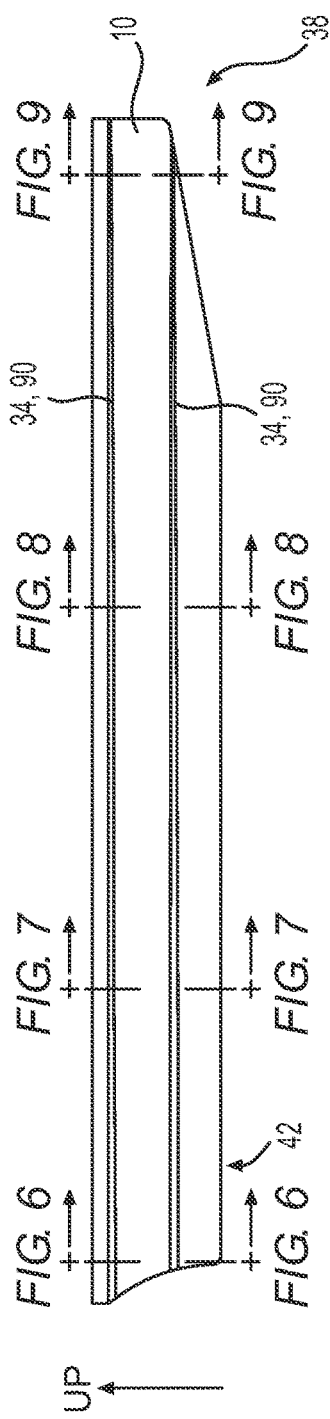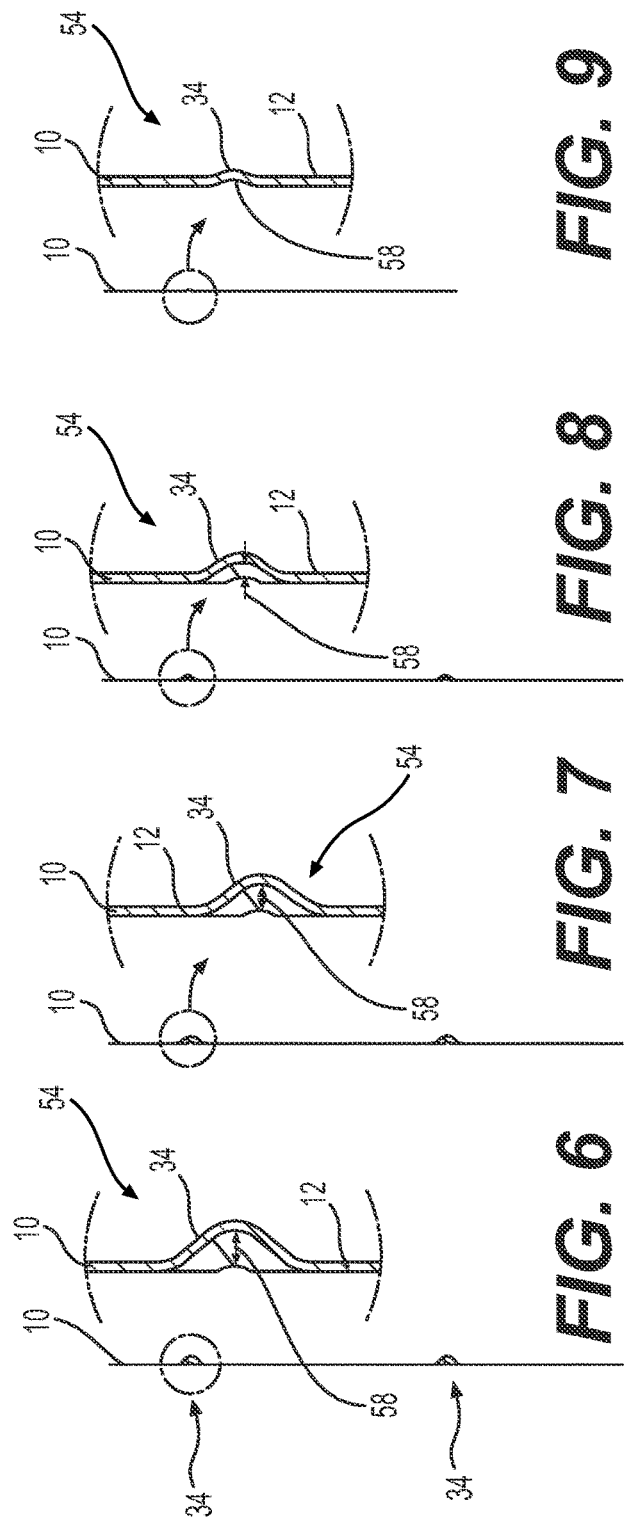

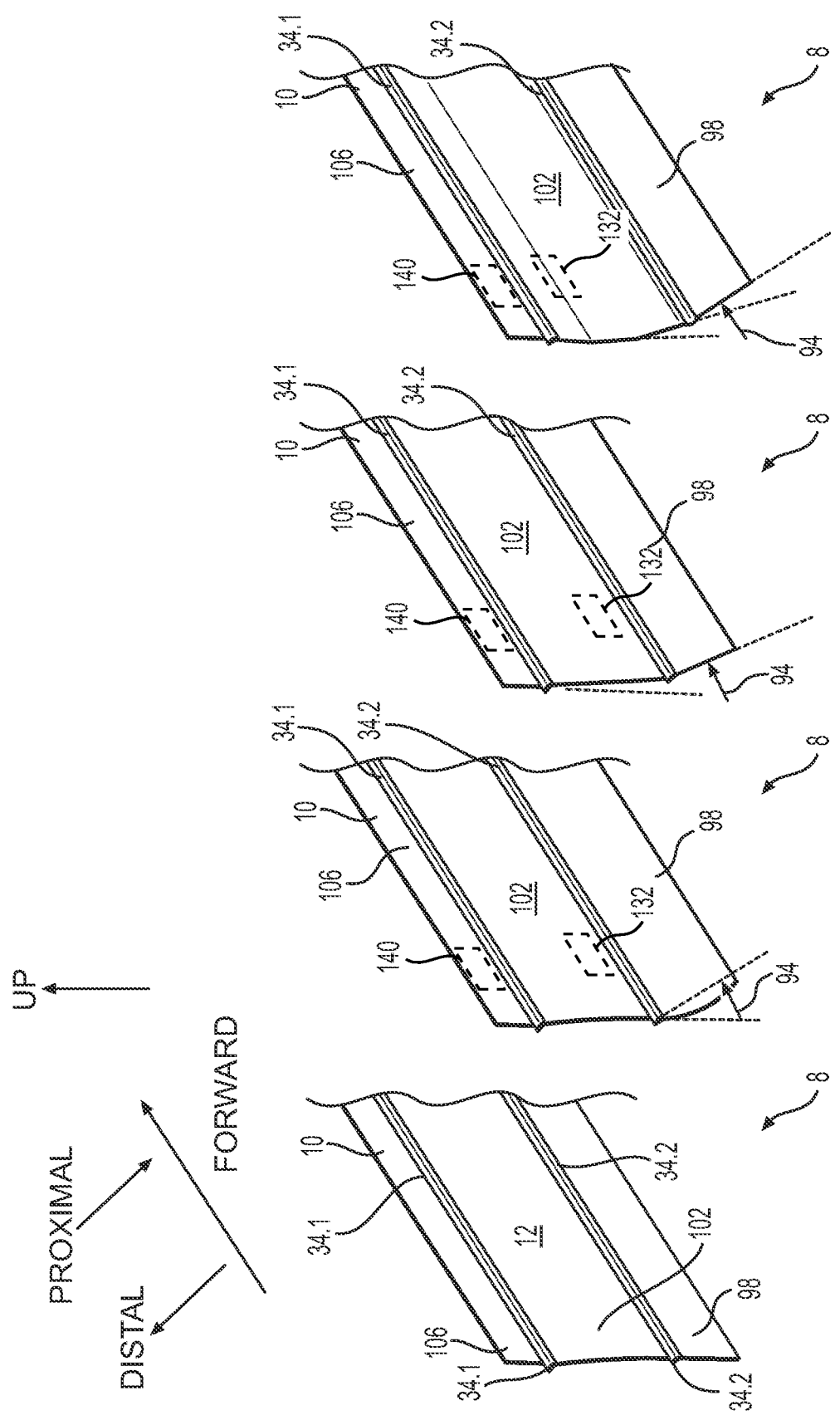

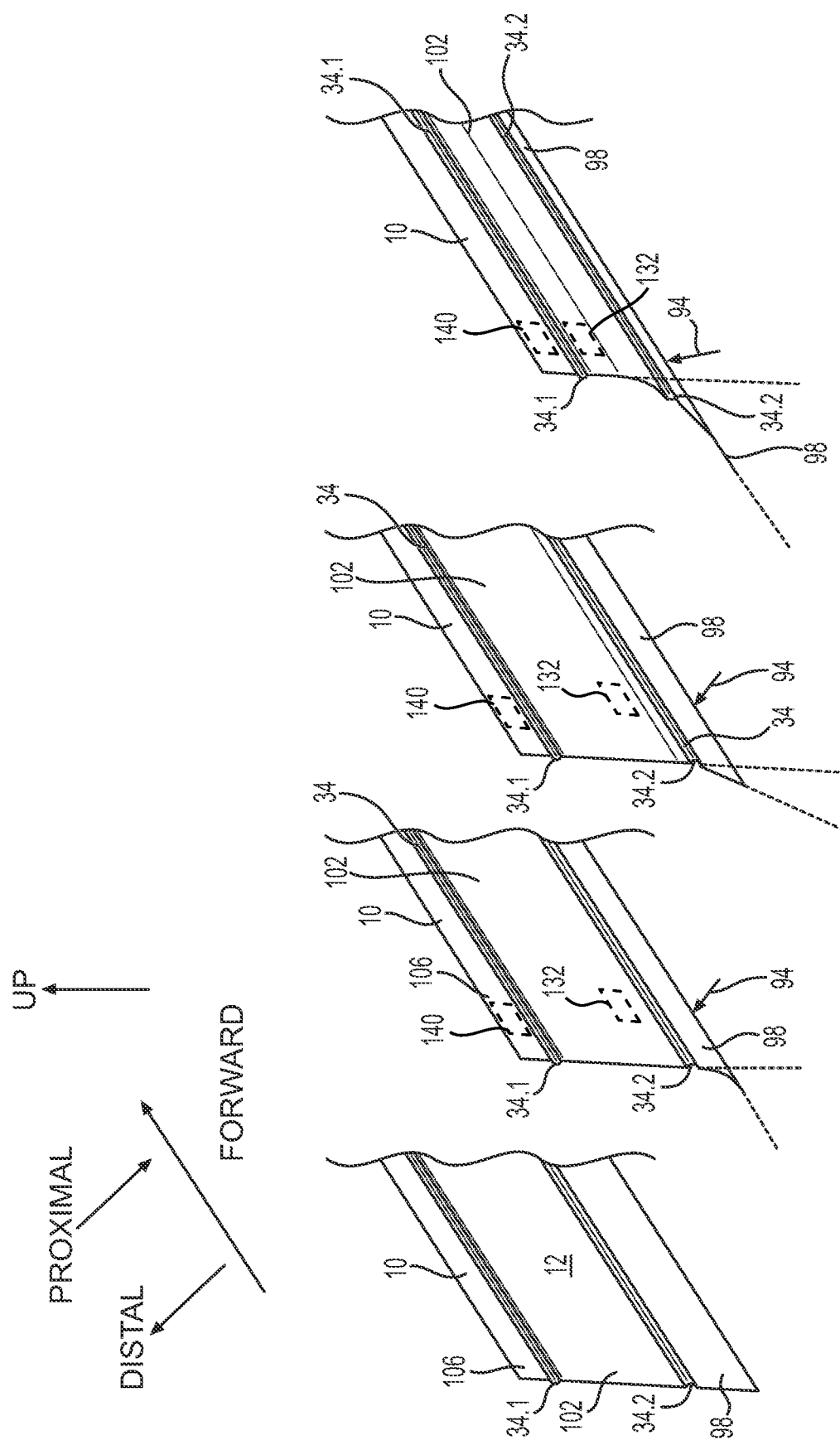

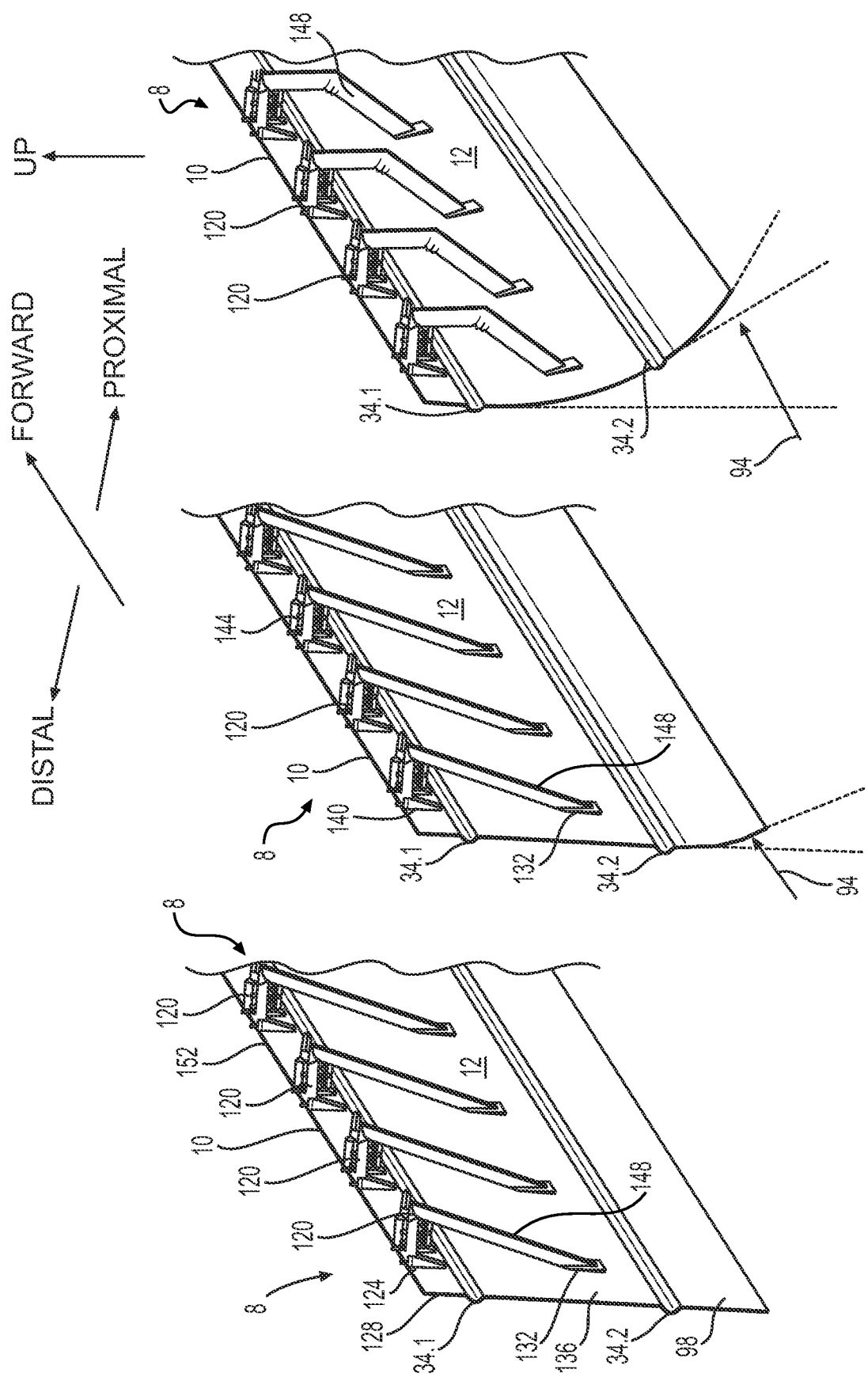

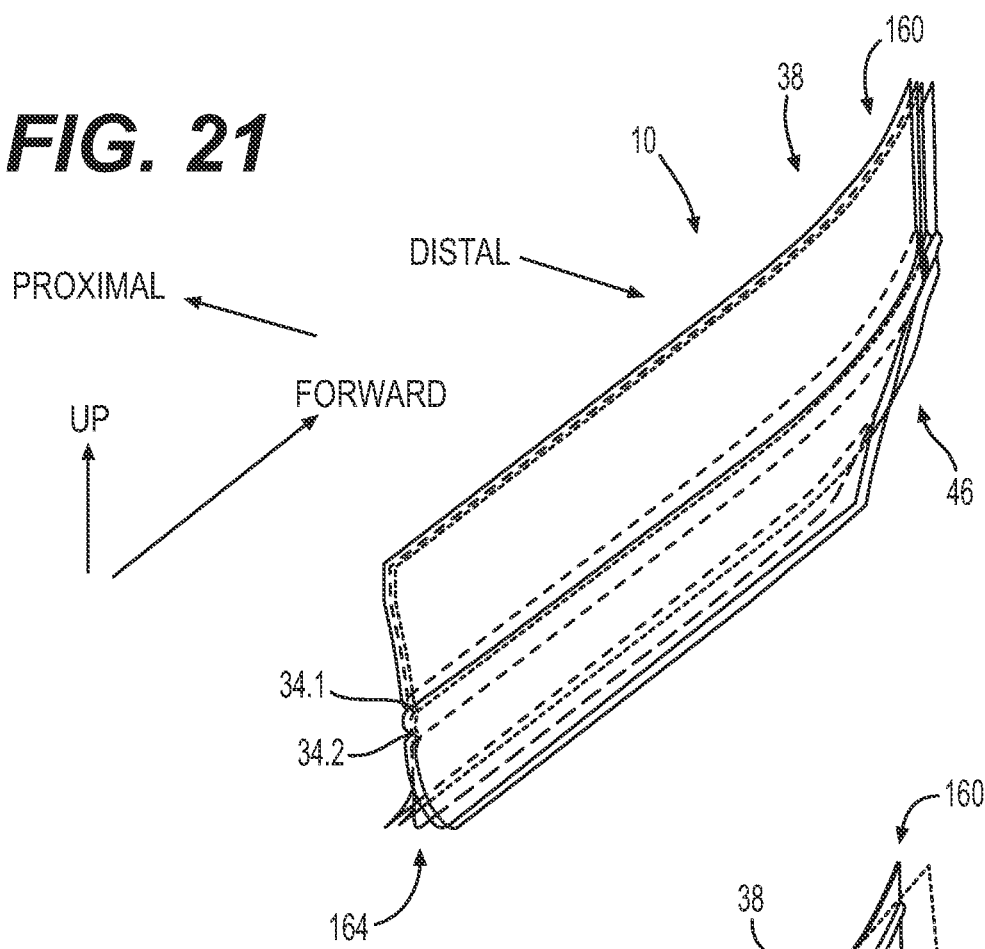

FIG. 23
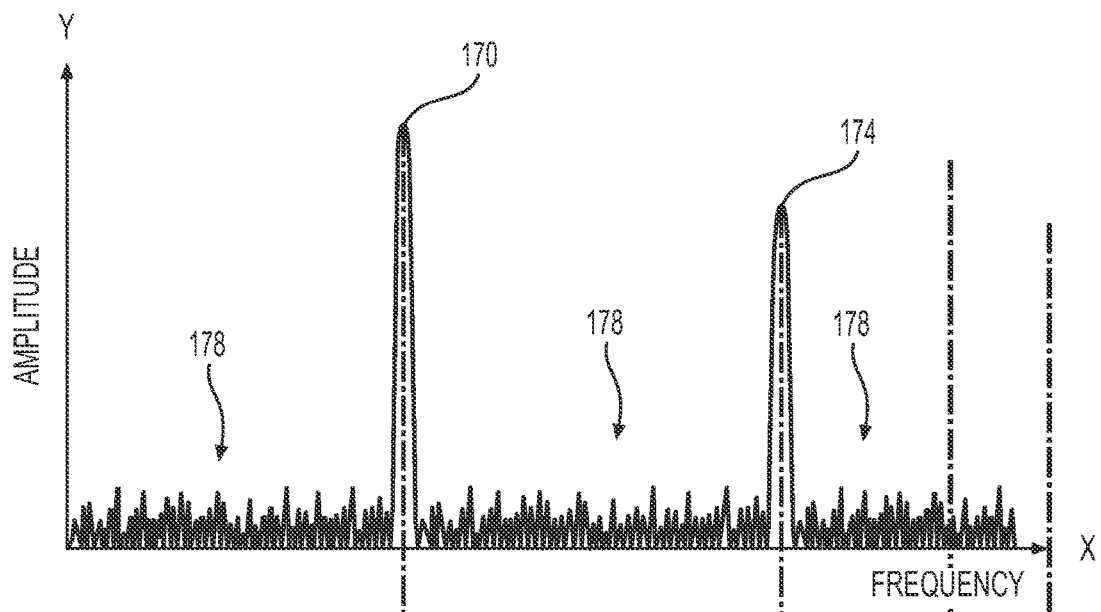
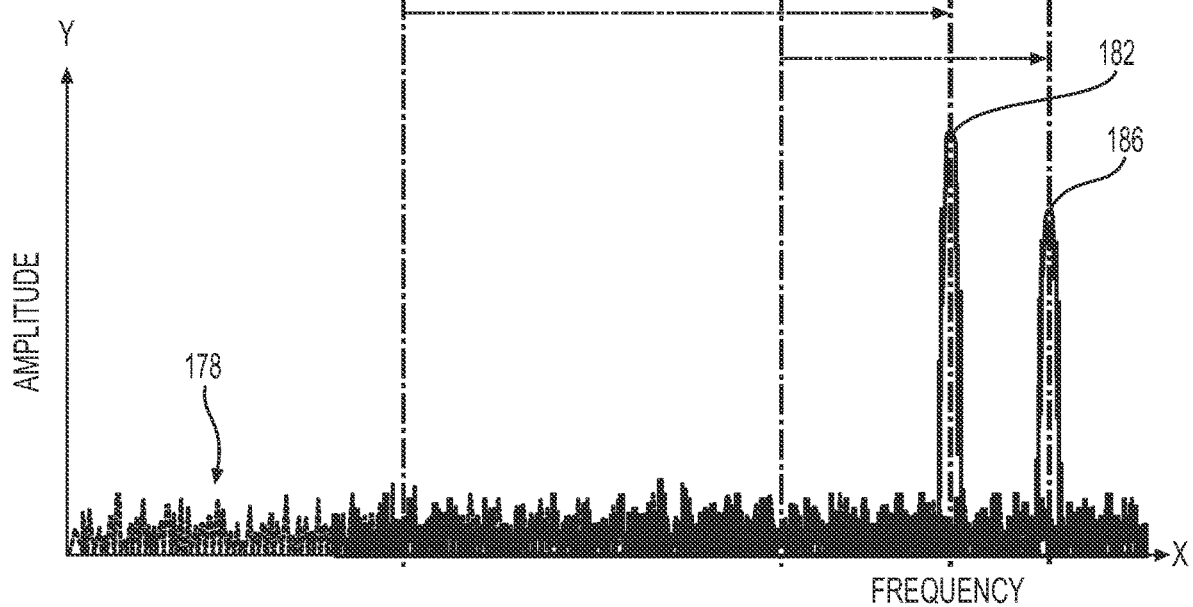
FIG. 24

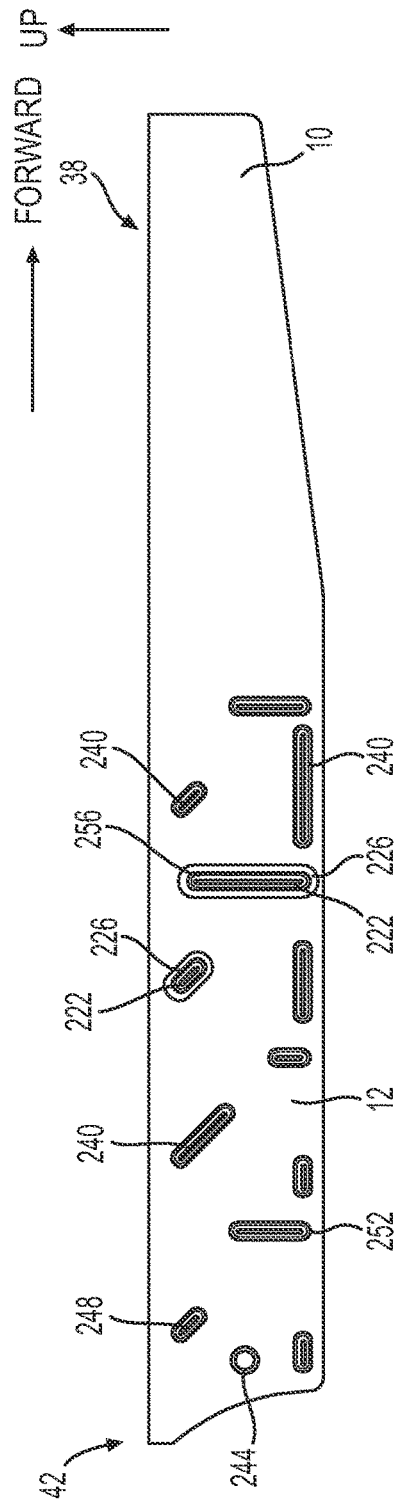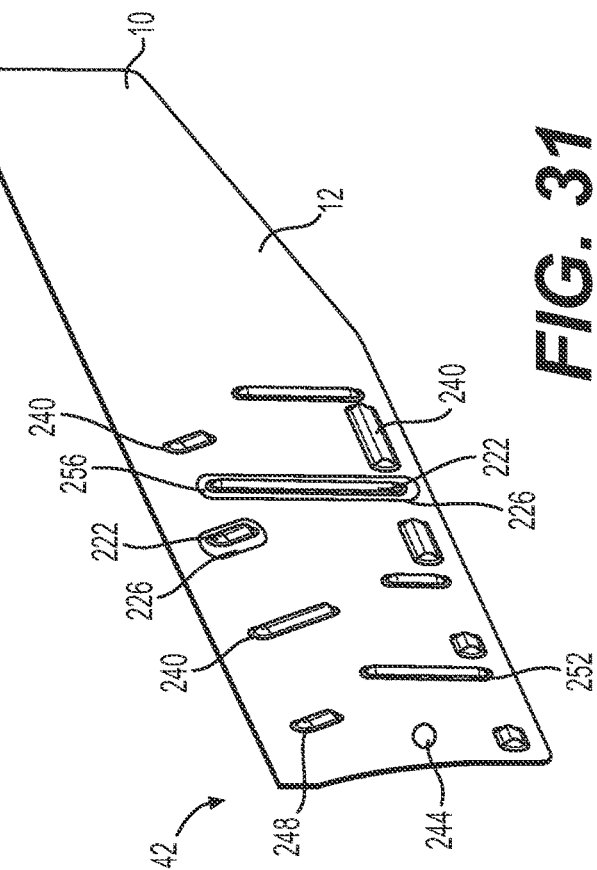

RIBBED AERODYNAMIC SKIRT PANEL AND ASSEMBLY THEREOF

FIELD OF THE INVENTION

The present invention generally relates to the field of ribbed aerodynamic skirt panels for the transport industry. Specifically, the present invention relates to aerodynamic skirt panels including three dimensional patterns, corrugations or ribs thereon.

BACKGROUND OF THE INVENTION

Aerodynamic skirt apparatuses are prevalent these days for improving the aerodynamics of a vehicle. Aerodynamic skirt apparatuses are added on vehicles in areas where aerodynamic improvements can be made for channelling and deflecting air around the vehicle for reducing air drag. Aerodynamic skirt apparatuses include a pair of aerodynamic skirt panels and mounting brackets for securing the aerodynamic skirts to the vehicle. Airflow routing around the vehicle is of significant importance and a planar skirt surface might not optimally deflect the air flow around the vehicle.

Weight is also a fundamental issue for the fuel consumption of a vehicle. Therefore, aerodynamic skirt panels are generally made of a thin material that can flex, vibrate or oscillate with the road use. Skirt panels vibrations are excited with the road imperfections; resulting vibrations are dependent of the mass and stiffness of the assembly including the supporting brackets, the speed of the vehicle and the load of the vehicle, inter alia.

These vibrations can be detrimental to the life expectancy of the aerodynamic skirt. Indeed, material fatigue and other stress generated issues can be undesirably occurring.

SUMMARY OF THE INVENTION

The present invention includes many aspects and features. The aforesaid and other objectives of the present invention are realized by generally providing a corrugated or a ribbed aerodynamic skirt panel for use in an aerodynamic skirt assembly and method of use thereof Ribbed skirt panel is going to be used throughout the text of this application to facilitate reading thereof although the term ribbed is not intended to limit the scope of the invention and shall include variants thereof like embodiments implying skirt panel surface designs altering the inertia moment, stiffness, bending capacity, non-isotropic mechanical properties, surface flatness, corrugations, change in thickness, inter alia, of the skirt panel.

The aerodynamic skirt panel includes one of many ribs therein for improving the stiffness of the panel. The ribs are also useful to mitigate the vibrations caused by the vibrations of the road when the vehicle is moving. The ribs and corrugations can be disposed on various portions of the aerodynamic skirt panel with different shapes or forms.

At least one aspect of the present invention provides at least one rib formed in the aerodynamic skirt panel to increase longitudinal stiffness of the aerodynamic skirt, in accordance with at least one embodiment thereof. When a plurality of ribs is used, the ribs can be located parallel to each other with a predetermined distance therebetween. A first rib disposed on an upper portion of the skirt panel, close to the vehicle's floor, can be used to strengthen the skirt panel next to the vehicle's floor while a second rib, located below the first rib on the skirt panel, is going to influence the stiffness of a lower portion of the skirt panel.

At least one aspect of the present invention provides, in accordance with at least one embodiment thereof, a ribbed skirt panel that is thinner than a same size non-ribbed flat skirt panel, the ribbed skirt panel having a similar or an increased longitudinal stiffness and a higher natural frequency.

At least one aspect of the present invention provides at least one rib formed in the aerodynamic skirt panel in a direction parallel to the ground, or at an angle thereof, to increase combined vertical and longitudinal stiffness of the aerodynamic skirt in accordance with at least one embodiment thereof. Other additional ribs can be disposed on the skirt panels at different angles, parallel with the other ribs, or a combination thereof.

At least one aspect of the present invention provides at least one rib formed in a flexible and bending resilient aerodynamic skirt panel to increase the mechanical properties and the aerodynamic properties of the aerodynamic skirt while allowing vertical temporary elastic bending of the skirt panel that can be visibly appreciated when contacting a foreign object, in accordance with at least one embodiment thereof.

At least an aspect of the present invention provides at least one rib added on a substantially planar aerodynamic skirt panel using an additional part, or component, comprising the rib to increase or modify the mechanical properties and/or the aerodynamic properties of the aerodynamic skirt panel while allowing vertical temporary bending of the skirt panel, in accordance with at least one embodiment thereof.

At least one aspect of the present invention provides an aerodynamic skirt panel including at least one rib that can have a constant profile all along its length on the skirt panel or, alternatively, the rib can be progressively shaped with a profile that can vary between a shallow rib extending into a deeper rib or vice-versa, in accordance with at least one embodiment thereof.

At least one aspect of the present invention provides an aerodynamic skirt panel including at least one rib thereon, the at least one rib being used to influence the vertical bending of the skirt panel, when the lower portion of the skirt panel is raising given a transversal flexion of the skirt panel, by changing the elastic bending properties, deflection, or curvature, of the skirt panel in accordance with at least one embodiment thereof.

At least one aspect of the present invention provides an aerodynamic skirt panel including at least one rib, the at least one rib being used to influence the natural vibration frequency of the skirt panel by displacing significant frequency excitation signals of the skirt panel in a frequency range that is less excited by the road vibrations, the rib is therefore used so that the skirt panel has a natural frequency that is less excited by the range of excitation frequencies of the moving vehicle for a given range of speed, hence reducing the influence of the road vibrations communicated to the skirt panel, in accordance with at least one embodiment thereof.

At least one aspect of the present invention provides an aerodynamic skirt panel including at least one local short rib, the at least one local short rib being possibly located on the skirt panel at various locations for more precisely addressing vibrations of the skirt panel and aerodynamic improvements thereof, in accordance with at least one embodiment thereof.

At least one aspect of the present invention provides an aerodynamic skirt panel including at least one rib, the at least one rib being formed in the skirt panel at various locations for more precisely addressing vibrations and aerodynamic issues, in accordance with at least one embodiment thereof.

Another aspect of the invention provides a skirt panel including a rib formed therein and a distinct rib component secured to the skirt panel in a association of ribs intrinsically formed in the skirt panel and other ribs added to the skirt panel and secured thereon in a particular pattern, in accordance with at least one embodiment thereof.

The features of the present invention which are believed to be novel are set forth with particularity in the appended claims. Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which:

FIG. 5 is showing a side elevational view of a ribbed aerodynamic skirt panel, in accordance with principles and embodiments of the present invention;

FIG. 6 is showing a profile section view of a rib on a ribbed aerodynamic skirt panel, in accordance with principles and embodiments of the present invention;

FIG. 7 is showing a profile section view of a rib on a ribbed aerodynamic skirt panel, in accordance with principles and embodiments of the present invention;

FIG. 8 is showing a profile section view of a rib on a ribbed aerodynamic skirt panel, in accordance with principles and embodiments of the present invention;

FIG. 9 is showing a profile section view of a rib on a ribbed aerodynamic skirt panel, in accordance with principles and embodiments of the present invention;

FIG. 10 is showing an isometric view of a ribbed panel with no bending therein, in accordance with principles and embodiments of the present invention;

FIG. 11 is showing an isometric view of a ribbed panel with a level of proximal bending therein, in accordance with principles and embodiments of the present invention;

FIG. 12 is showing an isometric view of a ribbed panel with an increased level of proximal bending therein, in accordance with principles and embodiments of the present invention;

FIG. 13 is showing an isometric view of a ribbed panel with a further increased level of proximal bending therein, in accordance with principles and embodiments of the present invention;

FIG. 14 is showing an isometric view of a ribbed panel with no bending thereof, in accordance with principles and embodiments of the present invention;

FIG. 15 is showing an isometric view of a ribbed panel with a level of distal bending, in accordance with principles and embodiments of the present invention;

FIG. 16 is showing an isometric view of a ribbed panel with an increased level of distal bending, in accordance with principles and embodiments of the present invention;

FIG. 17 is showing an isometric view of a ribbed panel with a further increased level of distal bending, in accordance with principles and embodiments of the present invention;

FIG. 18 is showing an isometric view of a ribbed panel with no proximal bending, in accordance with principles and embodiments of the present invention;

FIG. 19 is showing an isometric view of a ribbed panel with a level of proximal bending, in accordance with principles and embodiments of the present invention;

FIG. 20 is showing an isometric view of a ribbed panel with an increased level of proximal bending, in accordance with principles and embodiments of the present invention;

FIG. 21 is showing an isometric view of a ribbed panel with a level of combined longitudinal and proximal bending, in accordance with principles and embodiments of the present invention;

FIG. 22 is showing an isometric view of a ribbed panel with a level of combined longitudinal and proximal bending, in accordance with principles and embodiments of the present invention;

FIG. 23 is showing an amplitude vs frequency exemplary spectrum analysis graph of vibration excitation of a non-ribbed aerodynamic skirt panel;

FIG. 24 is showing an amplitude vs frequency graph of vibration excitation of a ribbed aerodynamic skirt, in accordance with principles and embodiments of the present invention;

FIG. 30 is showing a side elevation view of a ribbed aerodynamic skirt including a plurality of shorter ribs and added ribs, in accordance with principles and embodiments of the present invention;

FIG. 31 is showing an isometric elevation view of a ribbed aerodynamic skirt including a plurality of shorter ribs and added ribs, in accordance with principles and embodiments of the present invention;

DETAILED DESCRIPTION

Figure 1:
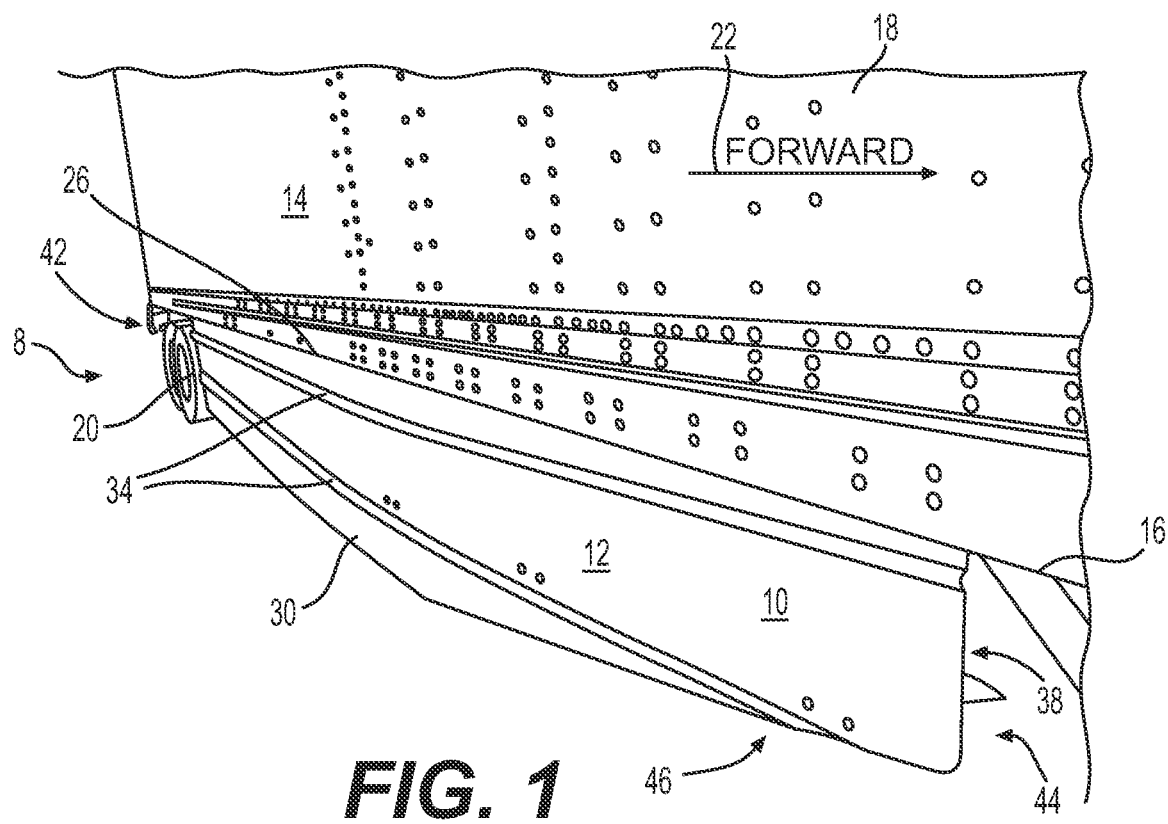
FIG. 1 is showing a front-right perspective view of a ribbed aerodynamic skirt installed on a right side of the vehicle, in accordance with principles and embodiments of the present invention.

As a preliminary matter, it will be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention discloses herein; only one or a plurality of the features disclosed herein; or combination thereof. As such, many embodiments are implicitly disclosing herein and fall within the scope of what is regarded as the invention.

Accordingly, while the invention is described herein in detail in relation to one or more embodiments, it is to be understood that this disclosure is illustrative and exemplary of the invention and is made merely for purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein to that which the Ordinary Artisan would understand such term to mean bases on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory Provision is intended to and should apply in the interpretation of such claim element with regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers." "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese.".

Referring the drawings, one or more preferred embodiments of the invention are next described. The following description of one or more preferred embodiments is merely exemplary in nature and is in no way intended to limit the invention, its implementations, or uses. Hence, a novel ribbed aerodynamic skirt in accordance with principles and embodiments of the present invention will be described herein after.

Figure 2:
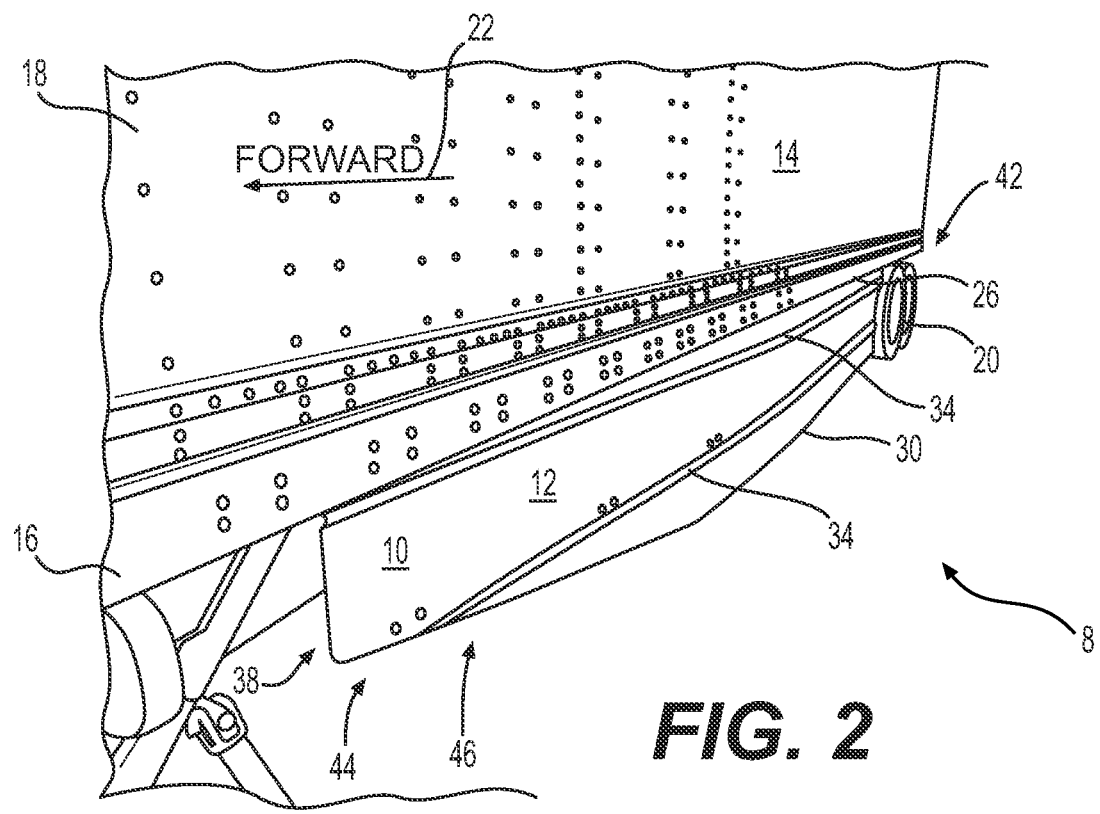
FIG. 2 is showing a front-left perspective view of a ribbed aerodynamic skirt installed on a left side of the vehicle, in accordance with principles and embodiments of the present invention.

FIG. 1 and FIG. 2 are illustrating an aerodynamic skirt assembly 8 including a ribbed aerodynamic skirt panel 10 secured on lateral sides 14 of a vehicle, namely embodied as a trailer 18, in a longitudinal direction 22 thereof along a length of the trailer 18. The ribbed aerodynamic skirt panel 10 is generally secured below the trailer floor 16, in front of the trailer's wheels 20. The ribbed aerodynamic skirt panel 10 includes an upper edge 26, the upper edge 26 being preferably adjacent to the trailer floor 16 in the illustrated embodiment, and a lower edge 30 thereof The embodied aerodynamic skirt panel 10 is including a pair of parallel ribs 34 disposed on the surface of the aerodynamic skirt panel 10 and extending between a forward portion 38 and a rearward portion 42 of the aerodynamic skirt panel 10. It can be appreciated the forward portion 38 of the aerodynamic skirt panel 10 is proximally bent 44 toward a longitudinal centerline of the trailer 18 although the forward portion 38 could be straight to match trailer's 18 particular configurations. It can also be noted the forward portion 38 of the aerodynamic skirt panel 10 has an optional reduced depth 46 to match vibrations as the front end of the skirt is less prone to vibrate, to help alleviate possible contacts with foreign objects when moving forward and improve the aesthetics of the skirt panel 10.

Figure 3:
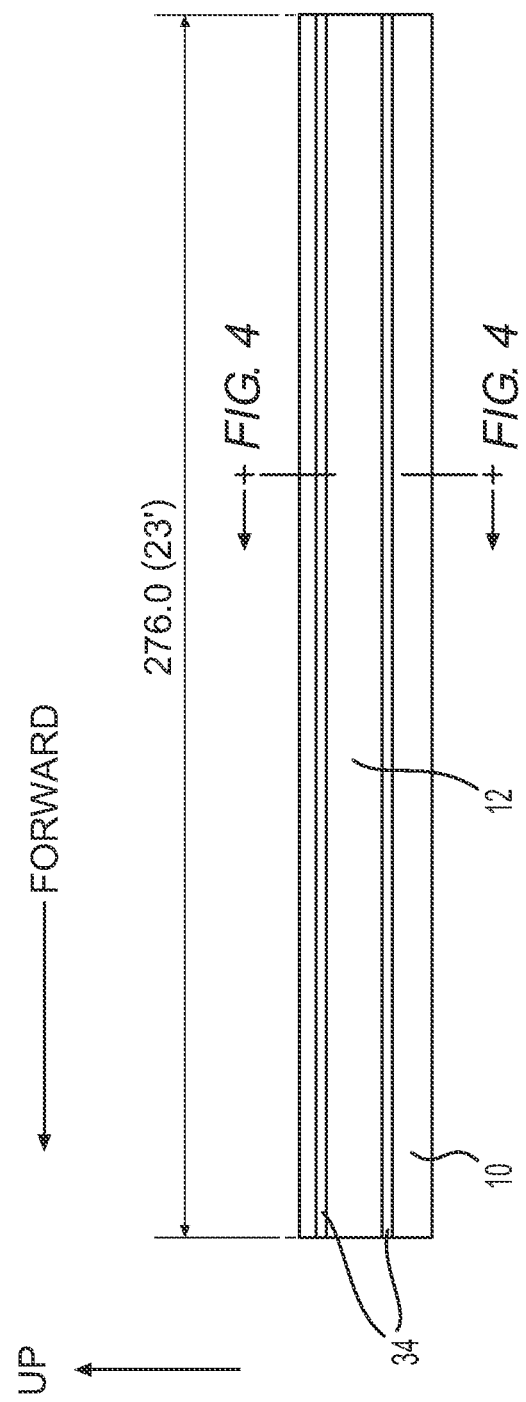
FIG. 3 is showing a side elevational view of a ribbed aerodynamic skirt, in accordance with principles and embodiments of the present invention.
Figure 4:
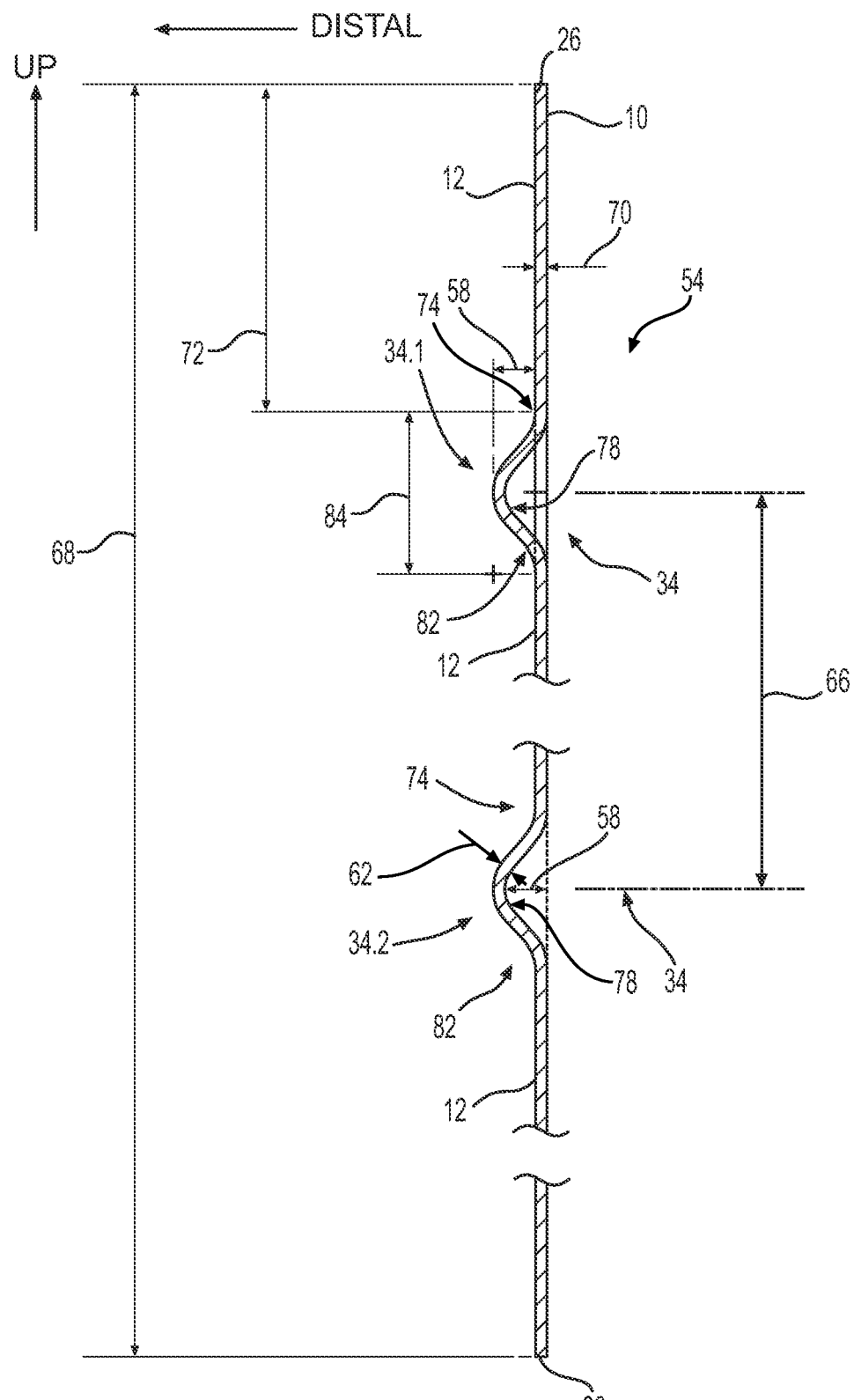
FIG. 4 is showing a section view of the ribbed aerodynamic skirt panel, in accordance with principles and embodiments of the present invention.

FIG. 3 illustrates a side elevation view of the ribbed aerodynamic skirt panel 10 that is including a pair of parallel ribs 34. Whereas, FIG. 4 being a section view of the aerodynamic skirt panel 10 of FIG. 3, one can appreciate a profile 54 and a depth 58 of the rib 34 in accordance with the presented embodiment shown in FIG. 4. It is possible to see the rib 34 is shaped in the aerodynamic skirt panel 10 and that a thickness 62 of the panel material where the rib 34 is located has substantially the same thickness as the thickness 70 of the flat portion of the skirt panel 10 as it is illustrated in FIG. 4. The aerodynamic skirt panel 10 includes two ribs 34 that are disposed parallel to one another. A vertical distance 66 between the two ribs 34 is of about 356 millimeters, as embodied, while the overall height 68 of the skirt panel 10 is about between 50 centimeters and 100 centimeters. The vertical distance 72 from the upper edge 26 to the first rib 34 is between about 5 centimeters and about 15 centimeters with a vertical distance 66 between the two ribs 34 can be different and within a range of about between 25 millimeters and 500 millimeters, alternatively about between 200 millimeters and 450 millimeters, more alternatively about between 300 millimeters and 400 millimeters apart. Other ranges could accommodate various other design requirements and are considered within the range of the present description. The thickness 70 of the aerodynamic skirt panel 10 of the illustrated embodiment is about 3 millimeters, could alternatively be between about 2 millimeters and about 4 millimeters and one functional shape of the rib 34 is embodied with a departure radius 74 of about 12 millimeters, joint with a middle radius 78 of about 12 millimeters followed with a closing radius 82 of about 12 millimeters. That means the illustrated ribs 34 are symmetrical and are embodied with a typical height 84 is of about 5 centimeters. All the dimensions identified above are for illustrative purposes and other dimensions, distances, height, shapes, radii and thickness can be different for adapting the ribbed skirt 10 design to particular vehicles without departing from the scope of the invention. Other ribs 34 and profile 54 could be used with non-similar radii 74, 78, 82 and form a non-symmetrical rib, which is not illustrated in FIG. 4. Also, it could be possible to use similar radii, but with different arc lengths, leading to an asymmetric shape, or a combination of different radii and arc length since the arc length would modify the tangent angles at inflexion points. The two ribs 34 are distally extending of a similar distance from a surface of the skirt panel 10 as embodied of about 12 millimeters. The two, or more, ribs 34 could distally expend of a different depth 58 although this embodiment is not illustrated in FIG. 4. The first rib 34.1 above can further distally extend than the second rib 34.2 below, in an alternate embodiment. The second rib 34.2 below can alternatively distally extend further than the first rib 34.1 above in another alternate embodiment.

FIG. 5 throughout FIG. 9 are illustrating aspects of the aerodynamic skirt panel 10 with a pair of ribs 34 including a rib 34 that includes a progressive profile, which can be referred to a progressive rib 90. The progressive rib 34, 90 has a depth 58 that is increasing or diminishing along a longitudinal direction of the rib 34. The depth 58 of a progressive rib 90, as embodied, is shallower in a forward portion 38 of the aerodynamic skirt panel 10 and is increasing in depth 58 further it extends toward the rearward portion 42 or the aerodynamic skirt panel 10. Progressive ribs 90 can alternatively have a depth 58 that is diminishing from the forward portion 38 to the rearward portion 42 of the aerodynamic skirt panel 10 and be encompassed within the scope of the present description despite this embodiment is not illustrated in FIG. 5 throughout FIG. 9. In these figures, the ribs 34 are disposed along the entire length of the aerodynamic skirt panel 10. In other unillustrated embodiments, the ribs 34 could be formed in a portion of the length of the panel 10 or be misaligned. The ribs 34 could begin at a certain distance from the front of the skirt 10 and get deeper along the length of the skirt 10. Conversely, the ribs 34 could begin at the front of the skirt 10 and stop before the rear of the skirt 42. With other unillustrated embodiments, the plurality of ribs 34 could begin at the front of the skirt 10 or end at the rear of the skirt panel 10 at a different longitudinal location along the skirt panel 10. All these unillustrated embodiments remain within the scope of this description.

The skirt panel 10 has flexible properties and the material used for the skirt panel 10 remains substantially in the elastic domain and can bend or flex in all directions, mostly vertically and longitudinally, when under an external force 94, and get back automatically without assistance in its original position once the external force 94, which could be applied at a different location, is removed. Generally, the skirt panel 10 material has little or no plastic domain and the thickness of the skirt panel 10 can allow substantial visible deformation of the skirt panel 10 and return to the skirt panel 10 original position generally without keeping plastic memory of the bending, generally without alteration of mechanical properties, generally without modification of form and/or generally without accumulating structural damages. The skirt panel 10 can thus allow substantial elastic deformation in reaction to an external force 94, like a sidewalk, a road bump, or other possible objects a skirt panel 10 can contact when used in real life without breaking or damaging the skirt panel 10. Support brackets, not illustrated in these figures, resiliently securing the skirt panel 10 to the trailer 18 are sized and designed to allow such flexibility and deflexion of the skirt panel 10.

Figure 46:
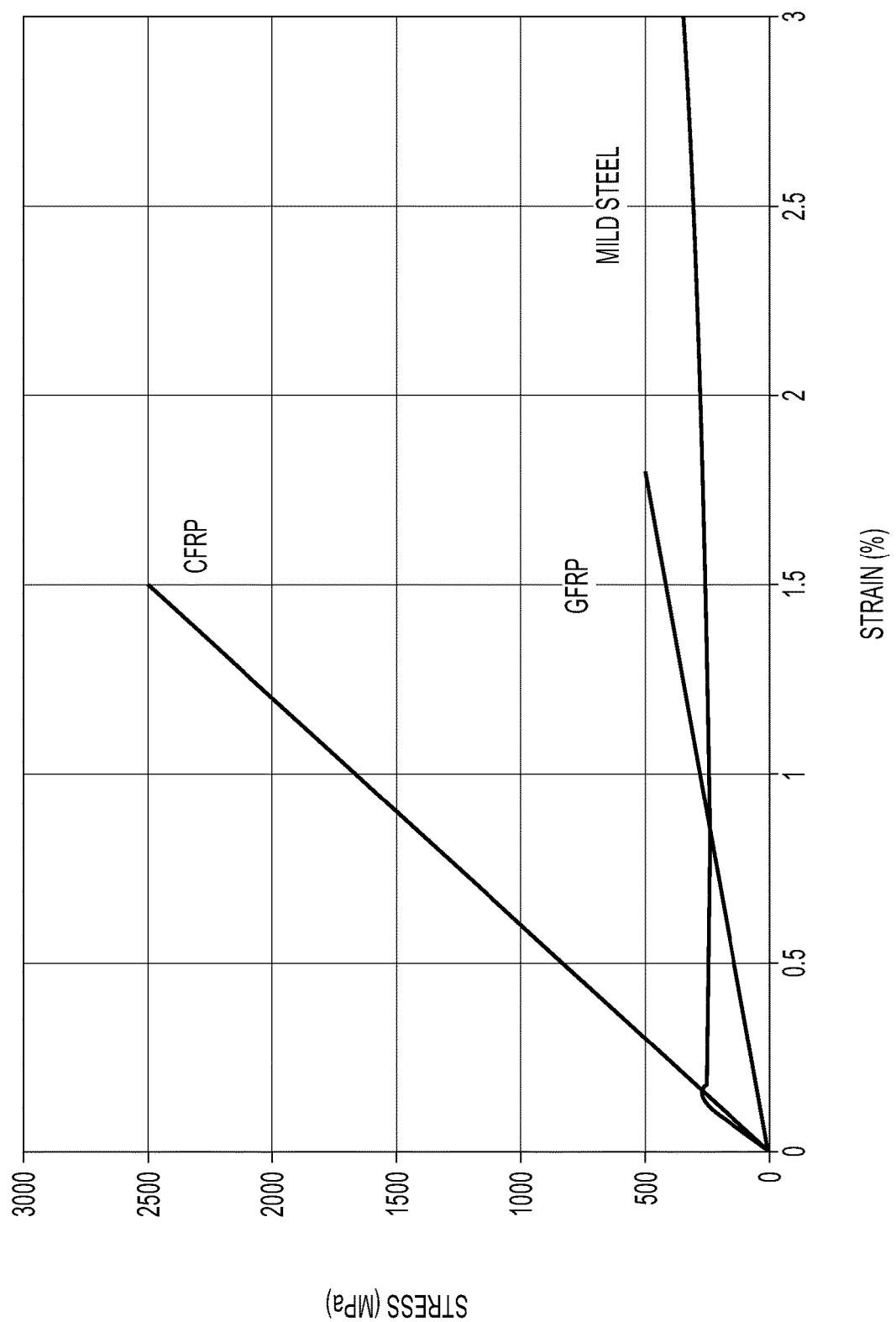
FIG. 46 is a strain v. stress graph in accordance with principles and embodiments of the present invention.
Figure 47:
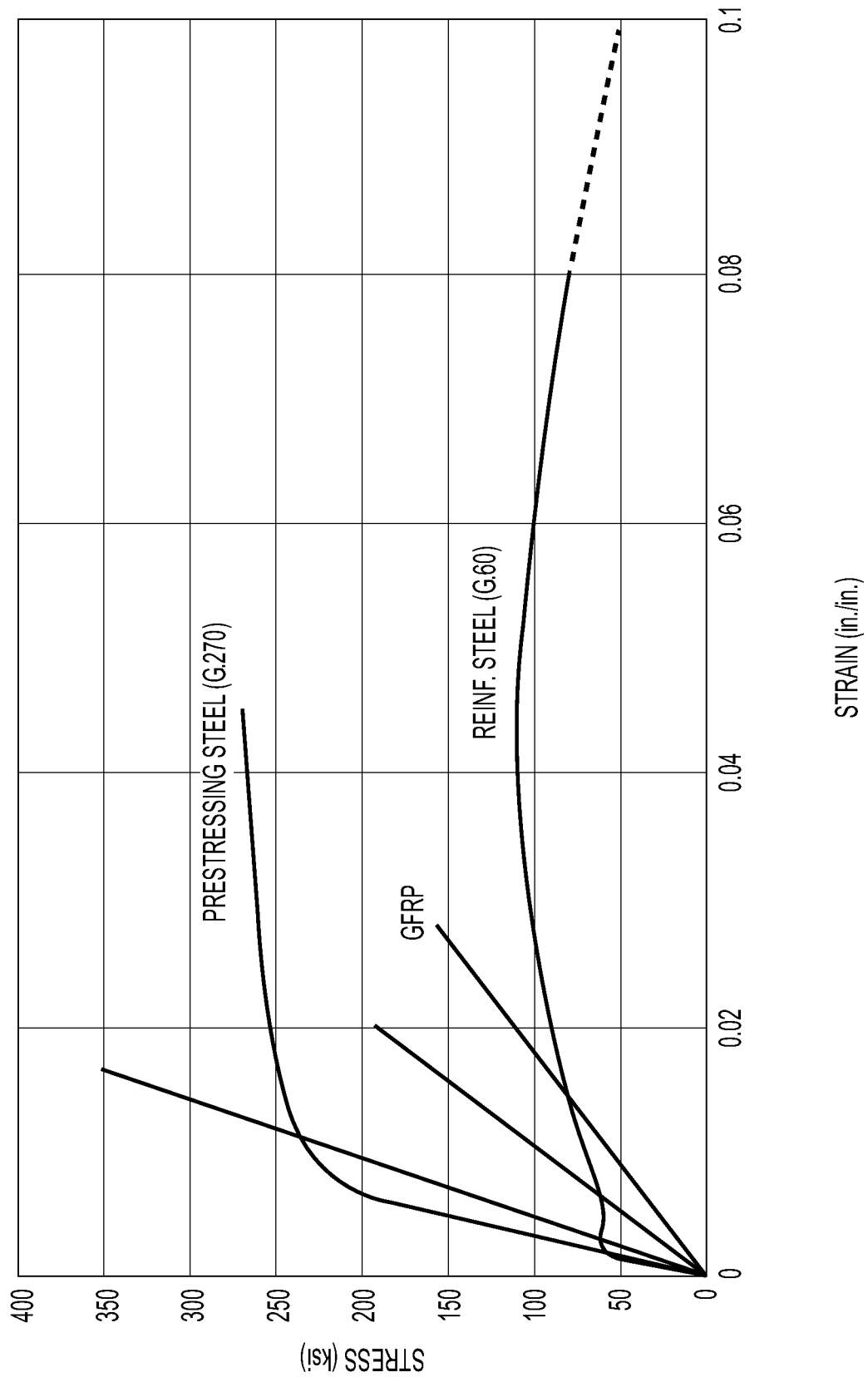
FIG. 47 is another v. stress graph in accordance with principles and embodiments of the present invention.

More precisely, materials suitable for manufacturing a skirt panel 10 in accordance with the present teaching could be, inter alia, carbon fiber reinforced polymer (CFRP), glass fiber reinforced polymer (GFRP) or more generally, fiber reinforced polymer (FRP) as their typical stress-strain curves are illustrated in FIG. 46 and FIG. 47 in reference with mild-steel showing clearly significant elastic deformation domain, the plastic deformation domain being the portion of the curves that exhibits a linear relation passing by the origin.

The maximum bending stress that a cantilever beam, or a skirt panel in the present situation, can withstand before reaching a plastic deformation, therefore staying in the elastic deformation range is described by the following formula. $\sigma = Mc/I$[[,]] where $\sigma$ is the maximum stress, M is the maximum bending moment, c is the distance from the top of the surface to the neutral axis of the skirt (c is equal to half of the thickness of the panel for the geometry of interest), and I is the moment of inertia. The maximum bending stress a is equal to the yield strength of the material, and the maximum deflection at the tip of the cantilever beam is derived to be $\delta = 2\sigma L^2/3tE$.

It can be appreciated the maximum deflection of a skirt panel 10 is generally proportional to the yield strength of the material (equal or greater for GFRP) and free length, which is the height of the skirt panel 10 in the present situation. The maximum deflection is also generally inversely proportional to the thickness of the panel and stiffness of the material. Accordingly, a GFRP of 3 millimeters, with yield strength of 500 MPa and stiffness of 30 GPa could achieve a maximum deflection $\delta = 0.0037\ L^2$ mm, whereas a steel panel of 0.4 millimeter thick (28 gauge), 250 MPa yield strength and 200 GPa stiffness can only achieve a maximum deflection of $\delta = 0.0021\ L^2$ mm, for example. Consequently, a GFRP skirt panel can achieve a much larger (about 175%) flexural deflection for a similar design. Given that the GFRP panel is about 7.5 times thicker and has higher strength, the panel is also much more resistant for local deformation, bump or any other impact or load applied thereon.

TABLE 1

| Property | Rib less panel of 4 mm thick and 76 cm high | Ribbed panel of 3 mm thick and 76 cm high | Notes |
|---|---|---|---|
| Moment of inertia (for longitudinal stiffness) | ≈4064 mm$^4$ | ≈18820 mm$^4$ | Ribbed panel is about 4.6 times stiffer in the longitudinal direction |
| Cross-section area (for longitudinal stiffness) | ≈3048 mm$^2$ | ≈2332 mm$^2$ | Ribbed panel weight is about 23% lighter |
| Maximum thickness | ≈4 mm | ≈15.6 mm | — |
| Distance "c" for proximal or distal bending (half thickness) | ≈2 mm | ≈1.5 mm | — |

From a practical point of view, large flexural deflections can be achieved with GFRP panels. With such large deformations, the behavior of the material does not follow the equations described above and can be greater while staying in the elastic domain. In fact, the flexural deformation can be such that the minimum radii of curvature for GFRP panels of thickness ranging from 2.8 millimeters to 4.4 millimeters can be, respectively, as small as about 50 millimeters to 125 millimeters.

An exemplary skirt panel 10 with two ribs 34 having their convex side toward the distal side of the trailer 18 is illustrated in FIG. 10 throughout FIG. 13 to illustrate a vertical resilient and non-permanent flexion when an external force 94 is applied in a laterally proximal direction to bend the skirt panel 10 toward the centerline of the trailer, for instance. The ribs 34 in the skirt panel 10 can be used to provide progressive bending behaviors. As an example, FIG. 10 is depicting a skirt panel 10 when no external force 94 is applied thereon. In contrast, FIG. 11 depicts a force 94 in the proximal direction and of a low magnitude applied on a lower portion 98 of the skirt panel 10 to bend, with this amount of force, the lower portion 98 of the skirt panel 10 without moving proximally the upper portion of the skirt panel 10. Now, the force 94 is increasing and the skirt panel 10 is further bending, proximally displacing an intermediate portion 102 of the skirt panel 10 as illustrated in FIG. 12. It can be appreciated the bending of the skirt panel 10 is mostly performed at the lower rib 34.2 when the lower rib 34.2 shape, size, assembly, material or design is providing a more flexible portion of the skirt panel 10. Should the selected lower rib 34.2 configuration provides the same flexibility than the remaining of the skirt panel 10, the skirt panel 10 will bend in a more actuated manner as depicted in FIG. 13. The same logic can be applied should the two ribs 34 have their convex side toward the proximal side of the trailer 18, although these embodiments are not illustrated in FIG. 10 throughout FIG. 13, but the rational will be appreciated by a skilled reader. FIG. 14 throughout FIG. 17 are showing a similar rational as expressed in FIG. 14 throughout FIG. 17 although the skirt panel 10 includes an upper rib 34.1 with its convex side toward the distal side and a lower rib 34.2 with its convex side on the opposite proximal side.

Turning now to FIG. 18 illustrating the skirt panel 10 with a plurality of support brackets 120 secured to the skirt panel 10 for securing the skirt panel 10 to the trailer 18. The support bracket 120 includes an upper skirt connection portion 124 for securing a corresponding upper portion 128 of the skirt panel 10 and a lower connection portion 132 for securing an intermediate portion 136 of the skirt panel 10. The upper skirt connection portion 124 of the support bracket 120 is generally orthogonally disposed with respect to a trailer securing portion 144 oriented generally horizontally to efficiently contact the trailer's floor 16 or analogous securing structure like an I-beam, for example. The lower connection portion 132 is generally substantially co-planar with the upper skirt connection portion 124 and connected to the trailer securing portion 144 via a flexible member 148. The flexible member 148 can be planar or can be shaped with a convex profile allowing substantial constant mechanical strength until the flexible member 148 buckles when a force exceeding a predetermined threshold is applied [like a tape measure if you will]. The illustrated skirt panel 10 is exemplified with a pair of ribs 34.1 and 34.2 and the upper skirt connection portion 124 is adapted to be secured above the upper rib 34.1 while the lower skirt connection portion 132 is adapted to be secured below the upper rib 34.1, above the lower rib 34.2. The skirt panel 10 is therefore allowed to bend, when a force 94 is applied thereon, below the lower rib 34.2 and below the lower connection portion 124 in a first instance. An increase of force 94 is going to further bend the lower portion 98 of the skirt panel 10 until the force exercised on the lower connection portion 132 is significant enough to buckle the flexible member 148, as illustrated in FIGS. 41 to 45.

It can be appreciated from the embodiment illustrated in FIG. 18 that the upper skirt connection portion 124 is located next to an upper edge 152 of the skirt panel 10 and next to the upper rib 34.1. The lower connecting portion 132 is located between the upper rib 34.1 and the lower rib 34.2, more precisely, as exemplified, the lower connecting portion 132 is designed to be located below half the vertical distance between the two ribs 34.1, 34.2. The support brackets 120 are illustratively disposed at substantially equal distance from each other although other configurations could require spacing them apart with unequal distances to match the trailer 18 configuration while remaining within the scope of the present invention.

The skirt panel 10 of FIG. 21 includes a pair of ribs 34.1, 34.2 substantially located close to each other at about half of the vertical height 68 of the skirt panel 10. The illustrated skirt panel 10 is shown to be flexible along the longitudinal direction 160 at a forward portion 38 of the skirt panel 10 and along the transversal direction 164 as explained before with respect to FIG. 20, inter alia. The forward portion 38 of the skirt panel 10 has a lesser vertical distance to mitigate physical contacts with external objects and reduce vibrations near the front of the skirt panel 10. The illustrated skirt panel 10 is superposing a plurality of bending configurations where the skirt panel 10 and the ribs 34.1, 34.2 are shown with simultaneous multi directional bending, along the longitudinal direction 160 and along the transversal direction 164. A skilled reader can appreciate the distance 66 between the ribs 34.1 and 34.2 can be distanced differently, as illustrated in FIG. 22, while allowing adjusted bending behaviors and mechanical properties in more than one plane, to say in the present example in the longitudinal direction 160 and along the transversal direction 164.

Road use of an aerodynamic skirt assembly 8 including skirt panels 10 is going to generate vibrations. Road use is going to generate vibrations over a range of frequencies and some frequencies are going to generate maximum amplitude, some frequencies could generate harmonic vibrations while some other frequencies could be further exited by the vibrations, this is what is called mechanical resonant frequency. Mechanical resonant frequency is the natural frequency of vibration in some mechanical systems and a plurality of resonant frequencies can exists in a same structure. When the frequency of an oscillating excitation caused by outside forces, such as road vibrations or wind caused by the movement of the vehicle on the road, matches the natural resonant frequencies of the skirt panel 10, the amplitude of vibrations will increase, which can cause excessive swaying in constructions such as an aerodynamic skirt assembly 8 including skirt panels 10. Therefore, skirt panels 10 are prone to this phenomenon and can benefit from the addition of ribs 34 or other alternative dampers to offset the risk of exceeding the mechanical capacity of the skirt panels 10 materials. This is particularly true when the skirt panel 10 thickness is reduced, thus diminishing the sustainable amount of force(s).

The most common equation used in the calculation of mechanical natural frequency uses the model of a simple mechanical system of a spring holding a weight. The resonant frequency, f, of the system is given by $f=(1/2\pi) \sqrt{(k/m)}$ being the mass of the suspended weight and k is the spring constant. A thinner skirt panel 10 has a reduced mass, and possible a reduced k if no ribs, and this can be material to significant vibrations, especially if excited at sensitive frequencies as illustrated in FIG. 23. Indeed, the graph in FIG. 23 is showing the frequency along the X axis and the amplitude along the Y axis. Signal 170 and signal 174 are representing natural excitation of a rib-less skirt panel 10 when excited by normal road use while other lower portions of the graph are representing noise vibrations 178 along the remaining frequency spectrum. The addition of one or more ribs in a skirt panel 10 is altering its stiffness and rigidity. The ribs 43 are generally affecting the stiffness in a given direction by increasing the moment of inertia around the vertical axis of the skirt and this can change the excitable frequencies that are not corresponding to the natural excitation frequencies 170, 174. As it can be seen in FIG. 24 representing the locations of excitable frequencies 182, 186, the excitable frequencies 182, 186 are displaced at higher frequency that are above the normal road excitation frequencies 170, 174. The number of ribs 34, the size of the ribs 34, the locations of the ribs 34, the thickness of the skirt panel 10 and other parameters can be considered when designing a skirt panel 10 that is going to react to road use vibrations and wind-caused vibrations in a lesser manner, or simply be excitable to frequencies outside the normal use of the aerodynamic skirt assembly 8 on a trailer 18 moving on the road. Put differently, the addition of ribs 34 on a skirt panel 10 is changing its mechanical capabilities and is also changing the excitable frequencies to a higher range of frequencies that is less excitable by road use of the aerodynamic skirt assembly 8. This makes the skirt panel 10 less prone to being excited in a normal road use operation, which is desirable.

Figure 25:
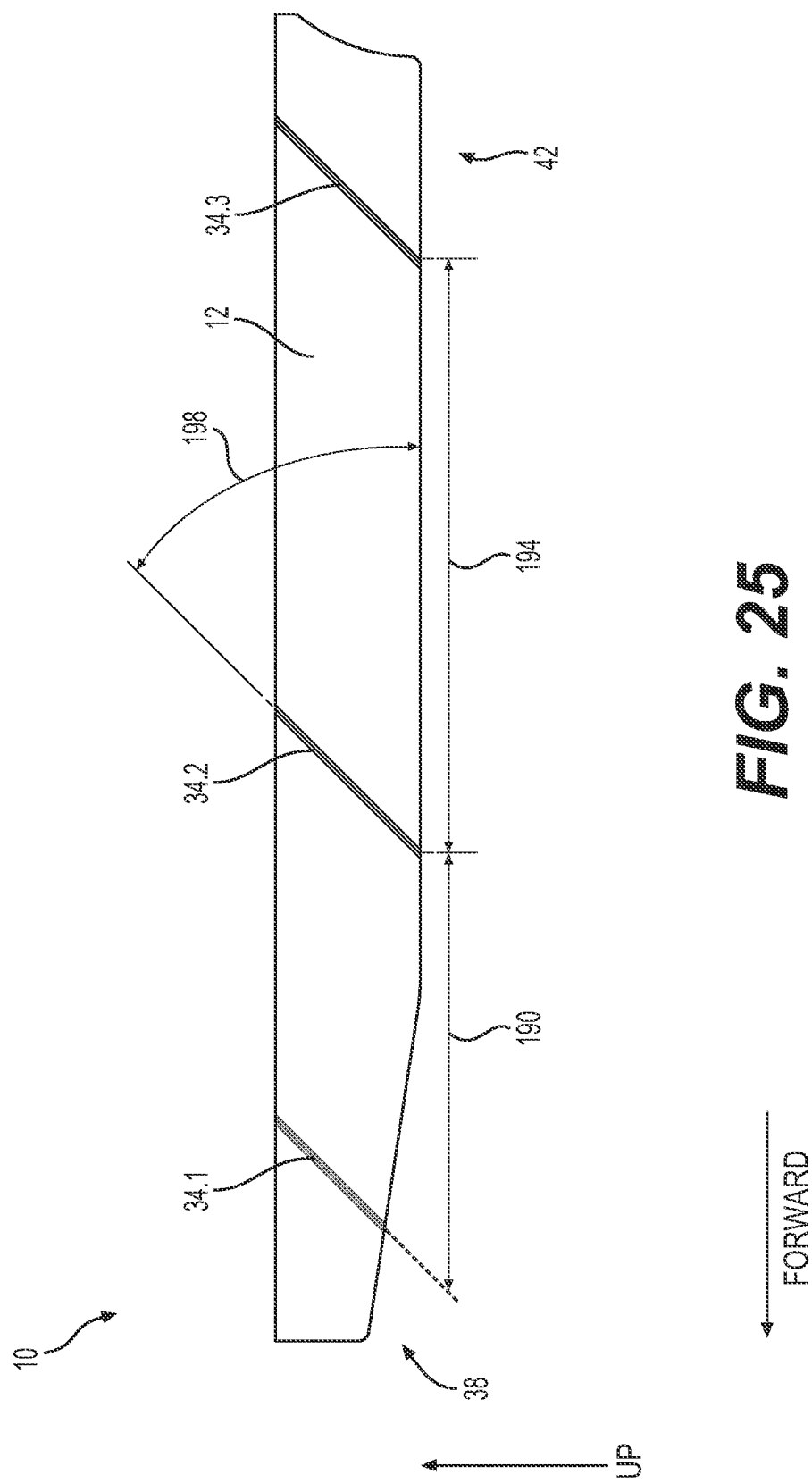
FIG. 25 is showing a side elevational view of a ribbed aerodynamic skirt including angled ribs thereon, in accordance with principles and embodiments of the present invention.

Ribs 34 can also be disposed on the skirt panel 10 at an angle thereof. As example, FIG. 25 is illustrating a skirt panel 10 with three ribs 34.1, 34.2, 34.3 disposed at different longitudinal distances from one another. Rib 34.1 is at distance 190 from rib 34.2, and rib 34.2 is at a greater distance 194 from rib 34.3. The three ribs 34.1, 34.2 and 34.3 are illustrated parallel to each other and are all disposed at a same angle 198 from horizontal. The number of ribs 34, the location of the ribs 34 along the skirt panel 10, the parallelism of the ribs 34 could be changed and the ribs 34 could be non-parallel to each other. The angle 198 from horizontal would then vary for different ribs 34. The angle 198 could range between about 0 degree to about 89 degrees from horizontal, alternatively from about 30-degree to about 80-degree from horizontal, preferably from about 30-degree to about 70-degree from horizontal, alternatively between about 30-degree to about 60-degree from horizontal and more preferably between 35-degree to about 50-degree from horizontal. All angles can be inverted in the opposite direction without departing from the scope of the invention. The embodiment illustrated in FIG. 25 is about 45-degree from horizontal. Angled ribs 34 can be desirable for progressively transmitting a shock occurring at the forward portion 38 of the skirt panel 10 and translating toward the rearward portion 42 of the skirt panel 10. The angled ribs 34 can also be desirable to alter simultaneously both the vertical and longitudinal behaviour of the skirt panel 10.

Figure 26:
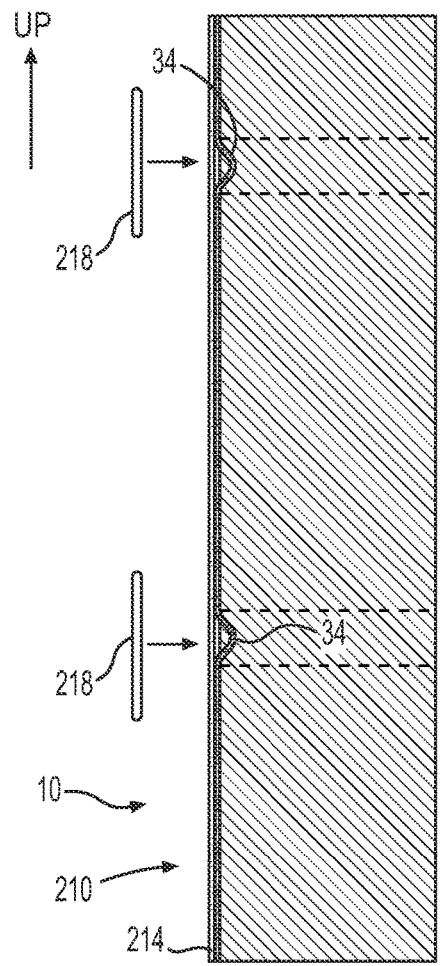
FIG. 26 is showing a front elevational section view of a ribbed aerodynamic skirt including two layers of skirt panel materials, in accordance with principles and embodiments of the present invention.

A layered skirt panel 210 construction is illustrated in FIG. 26. A ribbed skirt panel 10 is coupled with a flat skirt panel 214 to increase the thickness of the layered skirt panel 210 and hide the ribs 34 that are located in the proximal direction, toward under the trailer 18. The ribs 34 are facing the trailer 18 and are not visible from the outside for aesthetics purposes. The ribs 34 could be directed toward the distal side in other embodiments although not displayed in the drawings. The layered skirt panel 210 is covering the ribs 34 cavity hence preventing dirt or debris to possibly remain in the ribs 34 in addition to increase the mechanical strength of the region of the ribs 34. Portions of flat skirt panel 218 could replace the complete flat skirt panel 214 and be secured on the ribbed skirt panel 10 over the ribs 34 to more locally increase the mechanical properties around the ribs 34. Portions of flat skirt panel 218 are illustrated in FIG. 26 and are intended to replace the complete flat skirt panel 218 and be secured over the ribs 34. The complete flat skirt panel 214 can be glued, secured with fasteners or fused, inter alia, with the ribbed skirt panel 10 to provide proper assembly. The illustrated embodiment is using a ribbed skirt panel 10 including two ribs 34 although another number of ribs 34 could meet other mechanical requirements without departing from the scope of the invention. Furthermore, the vertical locations, the rib's angle from horizontal and the size of the ribs 34 can be embodied in various fashions as explained above and be within the possible embodiments covered by this application.

Figure 27:
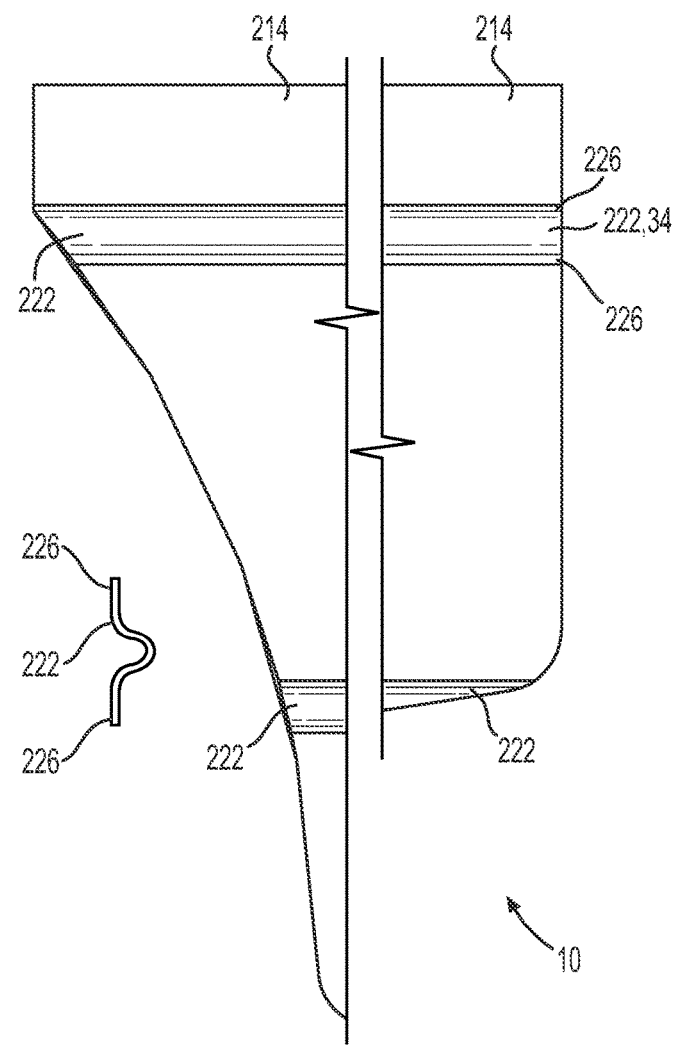
FIG. 27 is showing a side elevational view of a ribbed aerodynamic skirt including added individual ribs, in accordance with principles and embodiments of the present invention.

Alternatively, separate individual ribs 222 portions can be added on top of a flat skirt panel 214 as exemplified in FIG. 27. The separate individual ribs 222 are three dimensional structures, possibly made of the same skirt panel 10 material although not necessarily the case, that are distinct from the skirt panel 10 and adapted to be added on a rib-less skirt panel 214 or a ribbed skirt panel 10, can have a shape analogous to the previously described ribs 34 or have an alternate shape that would provide similar or improved benefits to the mechanical properties of the skirt panel 10. The individual ribs 222 can be embodied with a variety of profiles, heights, depths for optimising the mechanical properties of the skirt panel 10. For ensuring sufficient contact between the flat skirt panel 214 and the individual ribs 222, the latter can have extended contact portions 226 disposed on each side of the individual ribs 222 for augmented contact surfaces designed to provide sufficient shear area when the individual ribs 222 are affixed, secured, glued or held otherwise on the flat skirt panel 214, or on the ribbed skirt panel 10. The extended contact portions 226 disposed on each side of the individual ribs 222 can also be used for receiving fasteners or rivets to further secure the individual ribs 222 to the skirt panel 10, 214. The individual ribs 222 can be installed on a flat skirt panel 214, or added to a ribbed skirt panel 10, to improve the mechanical properties and vibration resistance capacity of the assembled skirt panel 10, 214, in any desirable configurations, namely the number of added individual ribs 222, their angle(s), their locations, their size, whether the individual rib 222 is disposed proximally or distally, or both, on the skirt panel 10. That is offering a tailored solution for adjusting a skirt panel 10 for specific vibration stimulations and trailer configurations. For example, the natural excitation frequencies of a loaded trailer 18 can be different than the excitation frequencies of a light trailer 18.

Figure 28:
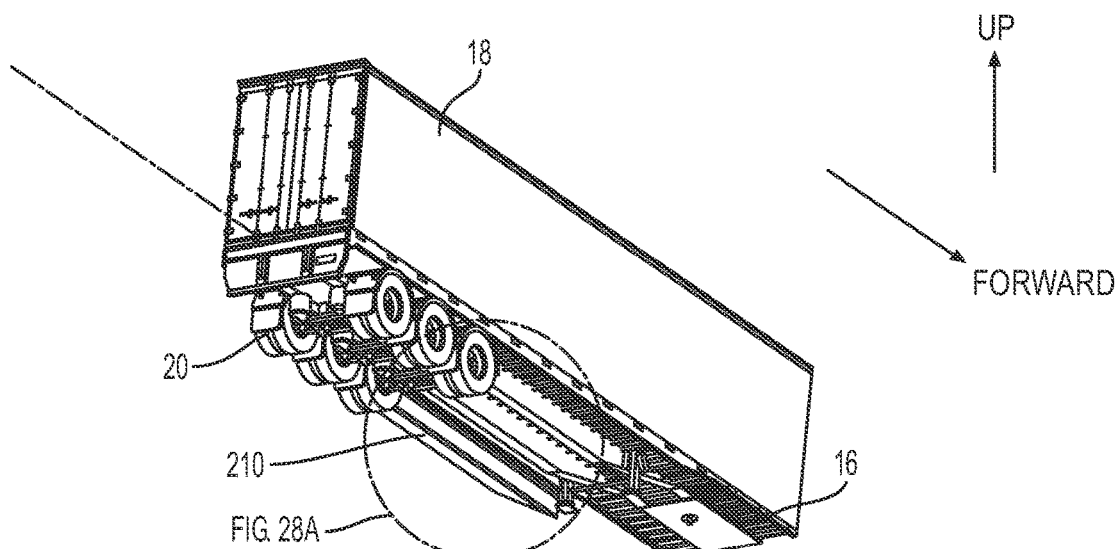
FIG. 28 is showing a down-right-rear isometric view of a ribbed aerodynamic skirt including multiple layers secured to a trailer as illustrated in FIG. 27, in accordance with principles and embodiments of the present invention.
Figure 28A:
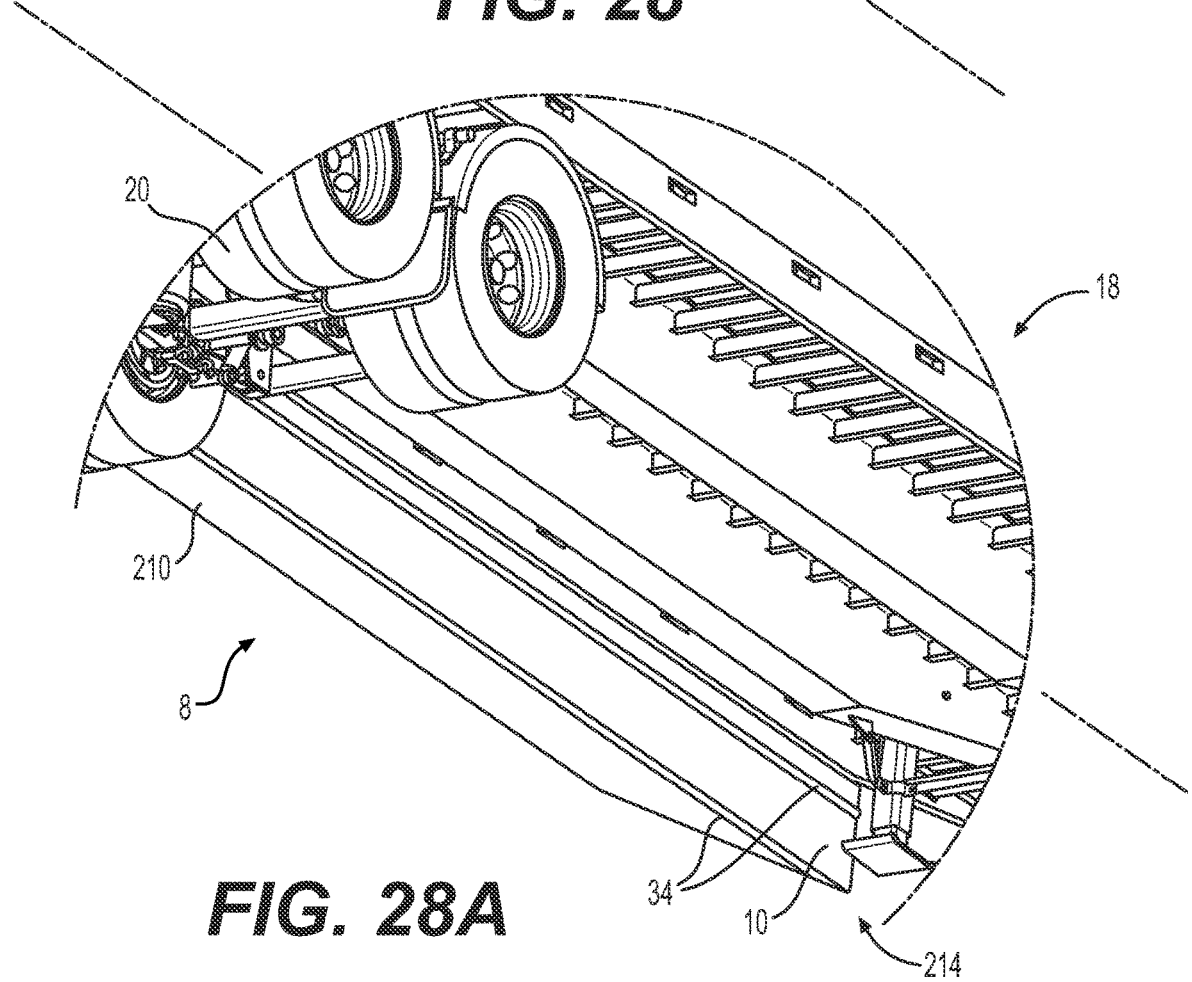
FIG. 28A is showing a down-right-rear isometric view of a portion of a ribbed aerodynamic skirt including multiple layers secured to a trailer as illustrated in FIG. 27, in accordance with principles and embodiments of the present invention.
Figure 29:
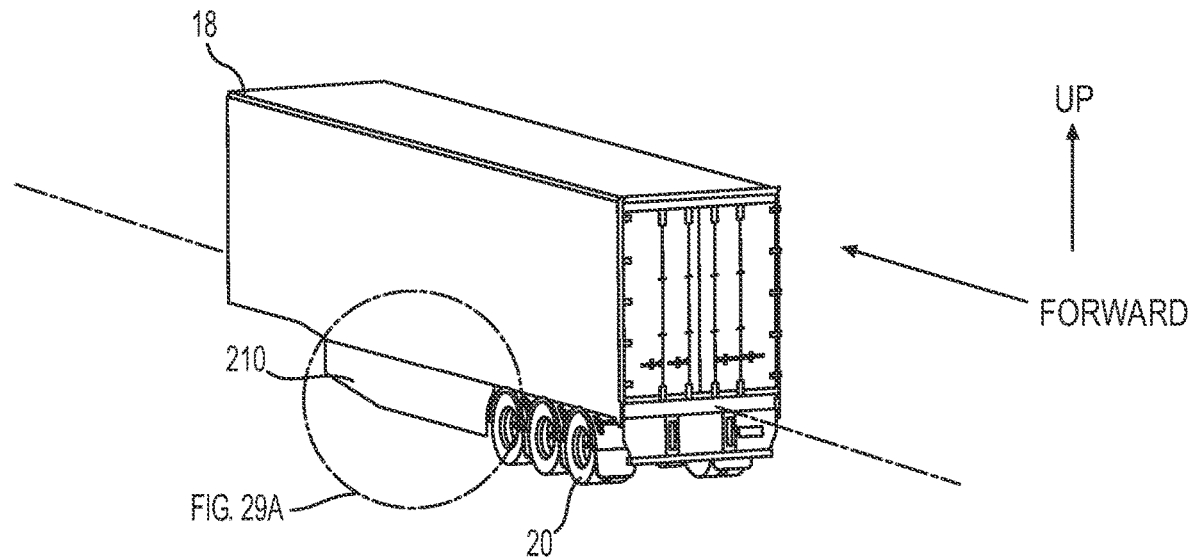
FIG. 29 is showing a rear-left isometric view of a ribbed aerodynamic skirt including multiple layers secured to a trailer with the ribs proximally disposed on the skirt panel as illustrated in FIG. 27, in accordance with principles and embodiments of the present invention.
Figure 29A:
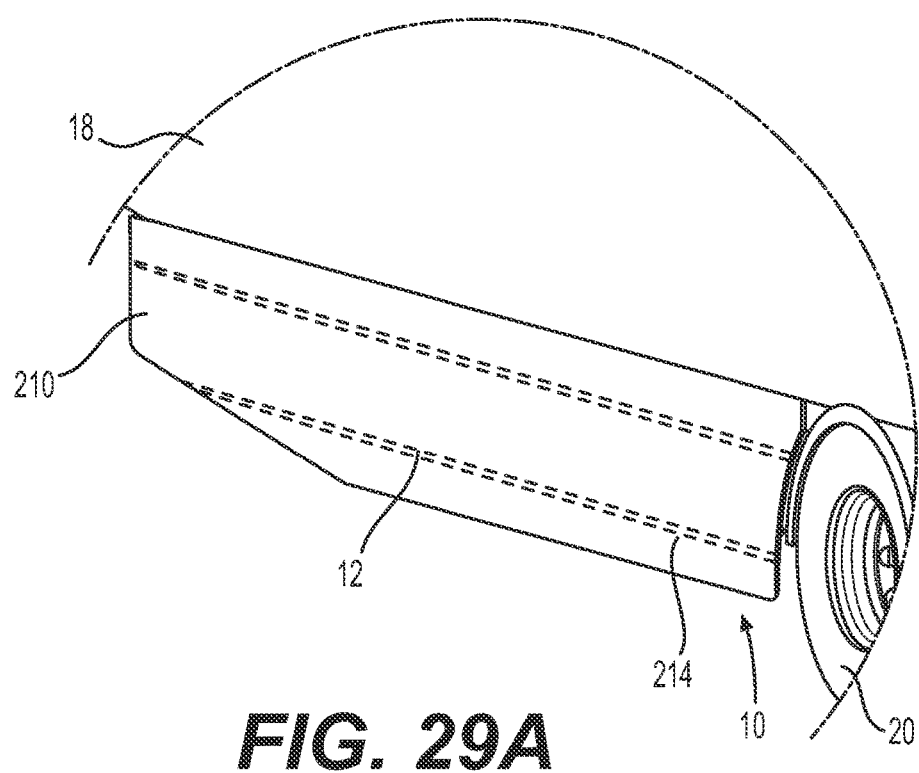
FIG. 29A is showing a rear-left isometric view of a portion of the ribbed aerodynamic skirt including multiple layers secured to a trailer with the ribs proximally disposed on the skirt panel as illustrated in FIG. 27, in accordance with principles and embodiments of the present invention.

FIG. 28 and FIG. 28A are depicting a layered ribbed skirt panel 210 with superposed layers consisting of a flat skirt panel 214 and a ribbed skirt panel 10 for enclosing the ribs 34 as explained with respect to FIG. 26. The layered ribbed skirt panel 210 is installed in an operating configuration on the trailer 18. The illustrated embodiment of FIG. 28 and FIG. 28A are depicting a pair of parallel ribs 34 although other configurations become apparent to a skilled reader and remain within the scope of the present invention. The layered ribbed skirt panel 210 is assembled in a fashion where the ribs 34 are protruding proximally toward a center of the trailer 18, which would give a flat exterior shape. The opposite configuration where the ribs 34 are extending proximally is illustrated in FIG. 29 and FIG. 29A included in the present description. Indeed, the exterior view of the layered ribbed skirt panel 210 is illustrated in FIG. 29 and FIG. 29A where a flat skirt panel 214 is visible from the outside while providing the advantages of a layered ribbed skirt panel 210. The illustrated embodiment in FIG. 28, FIG. 28A, FIG. 29, FIG. 29A could be alternatively be understood to be assembled with portions of skirt panel 218 secured on top of ribs 34 of a ribbed skirt panel 10 or with individual ribs 222 and remain within the scope of the invention.

The ribs 34 can be embodied with different lengths and locations, hereinafter referred to as designed ribs 240, on the skirt panel 10 as it is shown in FIG. 30 and FIG. 31. Designed ribs 240 can be embodied as embosses on the skirt panel 10, using local deformation of the flat skirt panel 214 or in combination with longer ribs 34 as previously described, with limited lengths to produce sometimes complex layouts of designed ribs 240 to achieve precise aerodynamic effect in addition to adjust the structural and mechanical properties of a section of the skirt panel 10, or adjust the structural, mechanical and aesthetic of the entire skirt panel 10. Alternatively, the designed ribs 240 can be added on top of a flat portion of the skirt 10 similarly to individual ribs 222 discussed above with respect to FIG. 27. Individual designed ribs 222 can include an extended contact portion 226 sized and designed to provide a surface area adapted to be glued or secured otherwise on the skirt panel 10. The designed ribs 222 can be of various lengths, from a semi-spherical shape 244, short elongated shape 248, medium elongated shape 252 and long elongated shape 256. The concept illustrated in FIG. 30 and FIG. 31 is using designed ribs 240 over the rearward portion 42 of the skirt panel 10 leaving flat the forward portion 38 of the skirt panel 10. It is possible to dispose the designed ribs 240 only over the forward portion 38 of the skirt panel 10 or over the entire surface of the skirt panel 10 for achieving desirable results for different types of uses.

Figure 32:
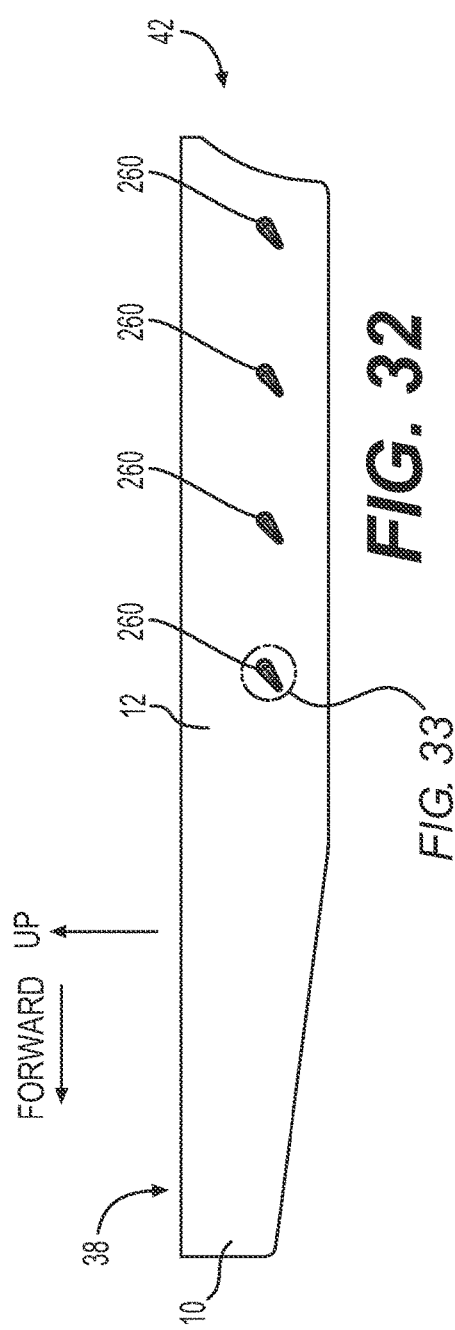
FIG. 32 is showing a side elevation view of a ribbed aerodynamic skirt including a plurality of progressive ribs, in accordance with principles and embodiments of the present invention.
Figure 33:
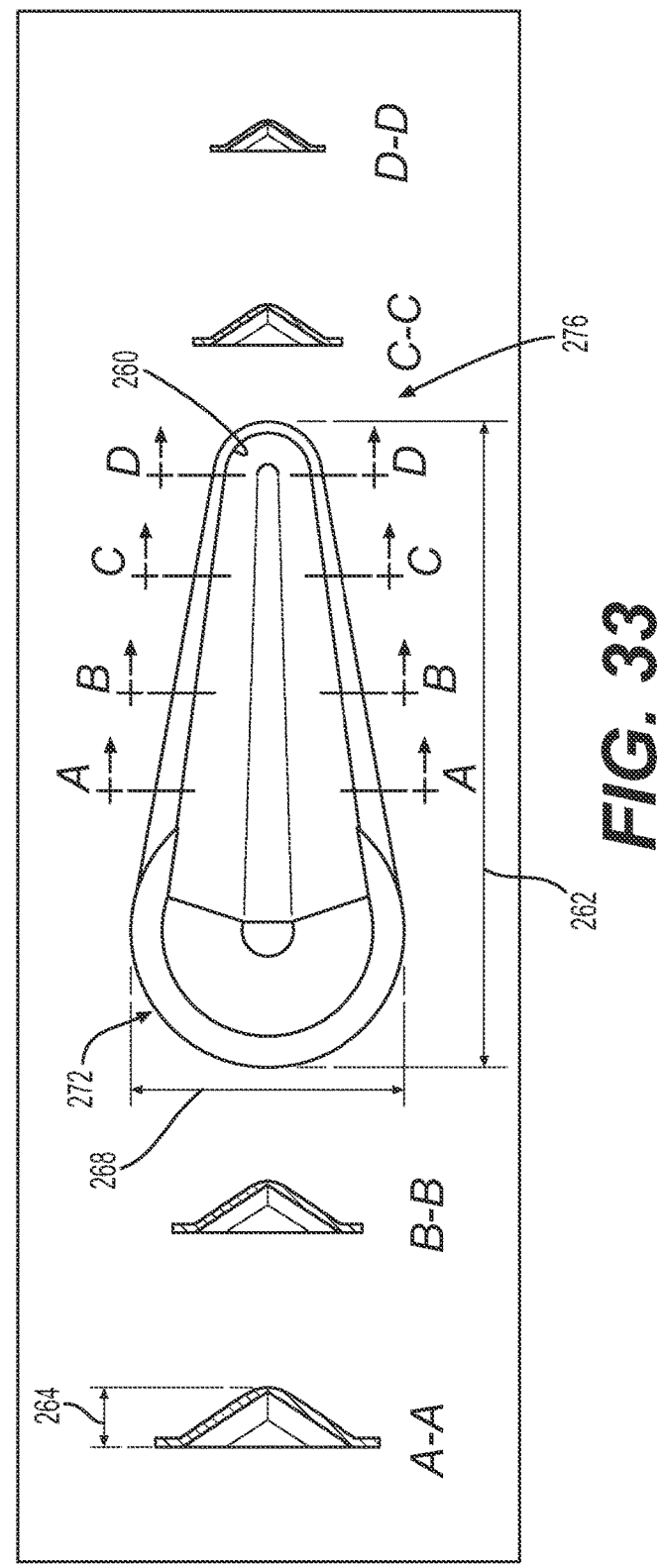
FIG. 33 is showing a side elevation detailed view of a progressive rib, in accordance with principles and embodiments of the present invention.
Figure 34:
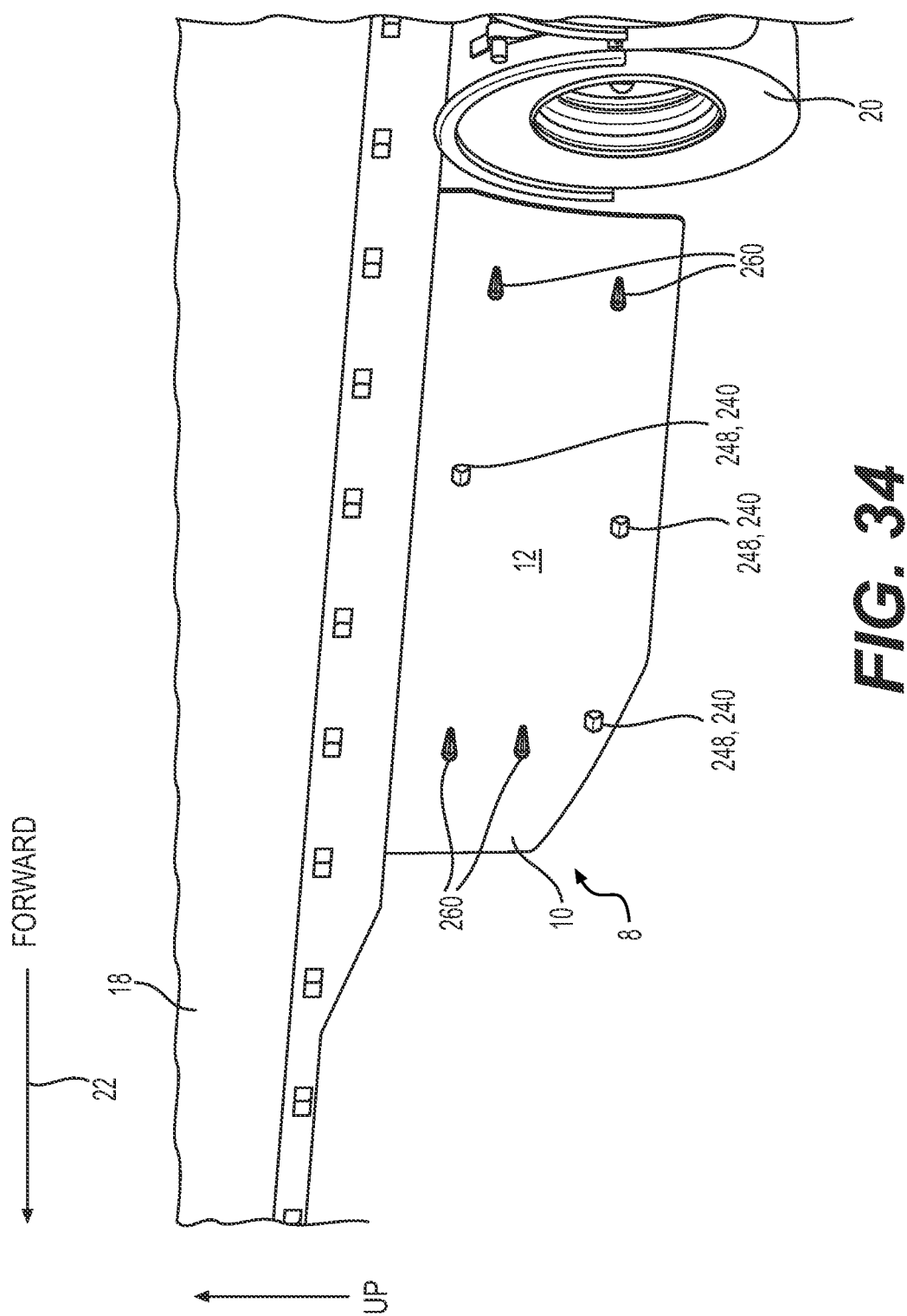
FIG. 34 is showing a left-rear isometric view of a ribbed aerodynamic skirt including a plurality of progressive shorter ribs and progressive ribs disposed on the distal side of the skirt panel, in accordance with principles and embodiments of the present invention.
Figure 35:
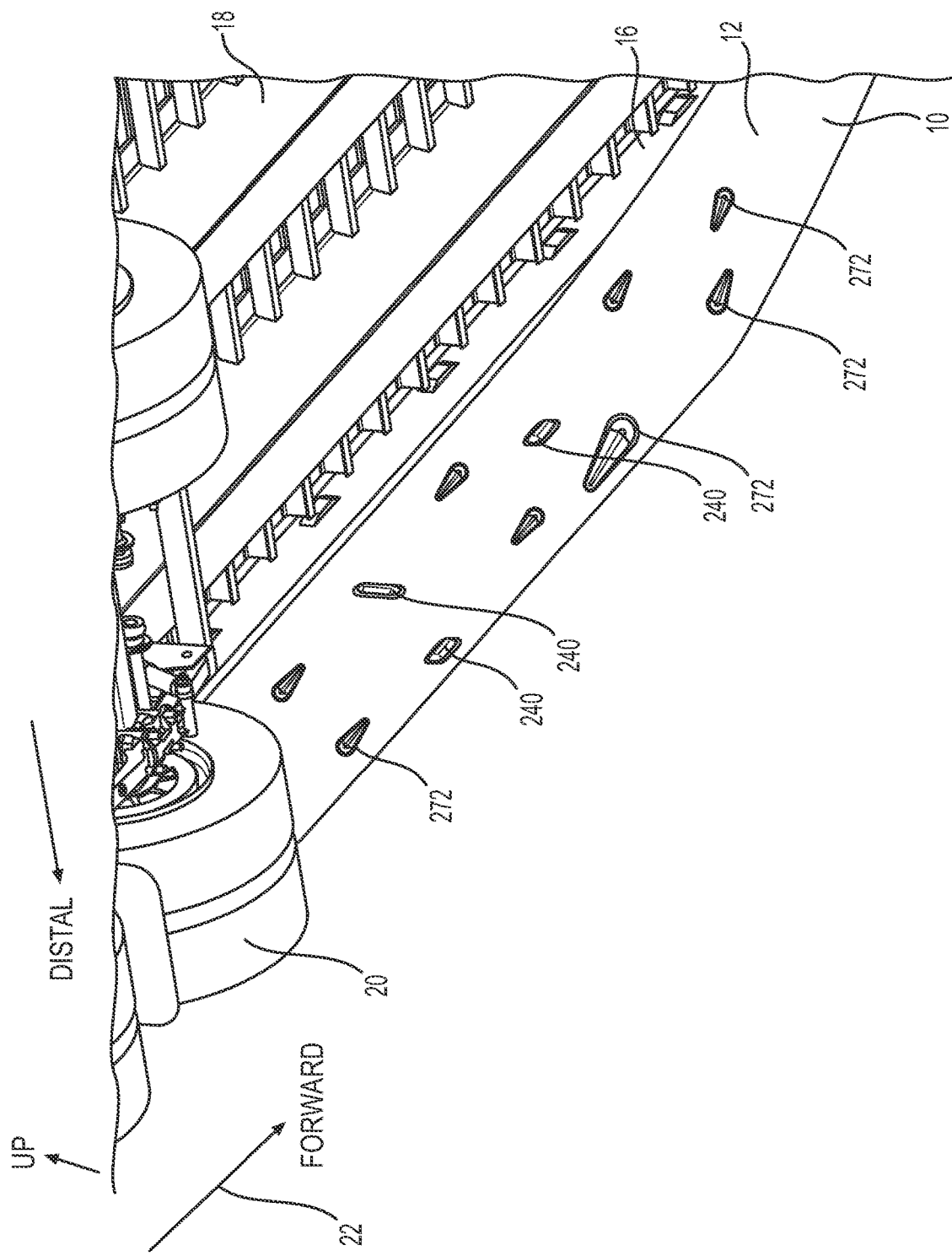
FIG. 35 is showing a left-bottom-rear isometric view of a ribbed aerodynamic skirt including a plurality of progressive shorter ribs and progressive ribs disposed on the proximal side of the skirt panel, in accordance with principles and embodiments of the present invention.

Designed ribs 240 illustrated in FIG. 30 have a constant profile but the profile could vary to achieve particular aerodynamic effects, vibration behavior, mechanical properties, among other possible effects. A progressive rib 260, as illustrated in the embodiment of FIG. 32 and FIG. 33, includes a progressive shape along a length 262, a depth 264 and a width 268 of the progressive rib 260. The progressive shape that is shown is linear in a sense that the change in dimension is made linearly, which gives an exterior shape is changing with a constant slope or angle. Alternatively, the progressive shape could be embodied with a non-linear shape where the change in dimension is not constant or has various angles like a serrated profile, an "egg" shape, a matrix of small cavities (like a golf ball) or protrusions, for example. The progressive rib 260 can be located parallel with the ground or at an angle thereof as exemplified in FIG. 32. In the present embodiment, the progressive rib 260 includes a large end 272 and a small end 276 that could be facing in any desirable direction to achieve the intended aerodynamic result and/or the intended mechanical properties alterations. Some rational would suggest the large end 272 be located forward on the skirt panel 10 for aerodynamic purposes although the opposite alignment could be desirable to reach an alternate effect. Progressive ribs 260 can be disposed on either side of the skirt panel 10 with the convex side located in the desired direction. Progressive ribs 260 can be used on any part of the skirt panel 10, in combination or not with other ribs embodiments discussed in the present application as further exemplified in FIG. 34 showing, from a distal point of view, and in FIG. 35, from a proximal point of view, a skirt panel 10 assembled to a trailer 18. As it can be appreciated, the skirt panel 10 includes a plurality of short elongated shape 248, designed ribs 240 and/or progressive ribs 260.

Figure 36A:
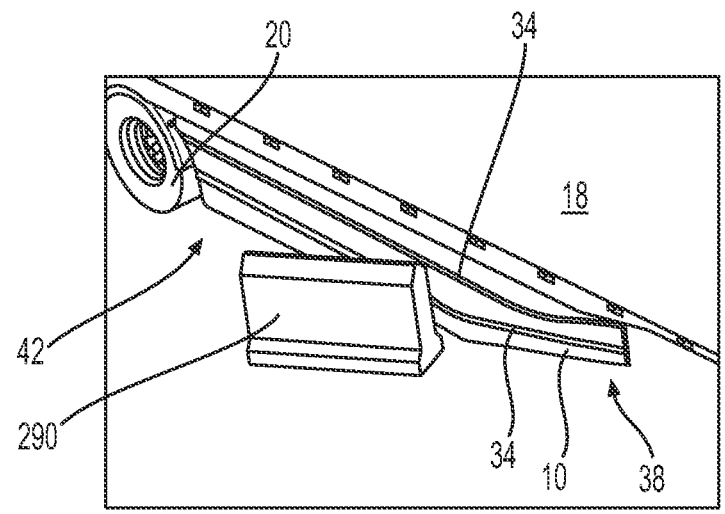
FIG. 36A is showing a front-right isometric view of a ribbed aerodynamic skirt including a rib in contact with a foreign object, in accordance with principles and embodiments of the present invention.
Figure 36B:
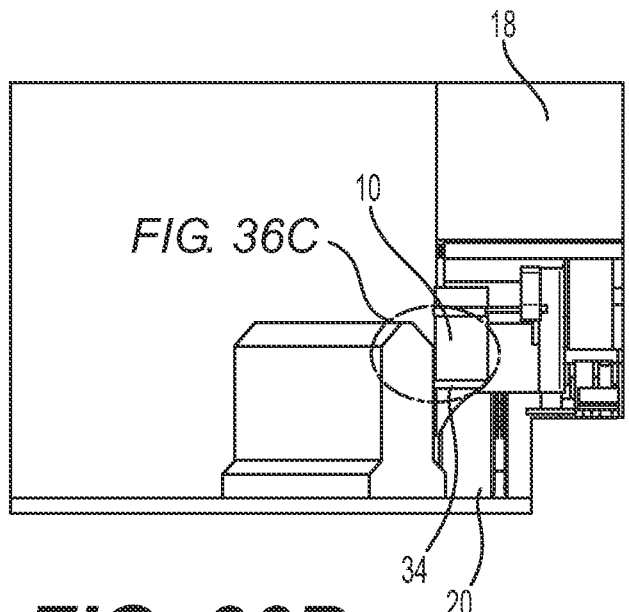
FIG. 36B is showing a front elevation view of a ribbed aerodynamic skirt including a rib in contact with a foreign object in accordance with principles and embodiments of the present invention.
Figure 36C:
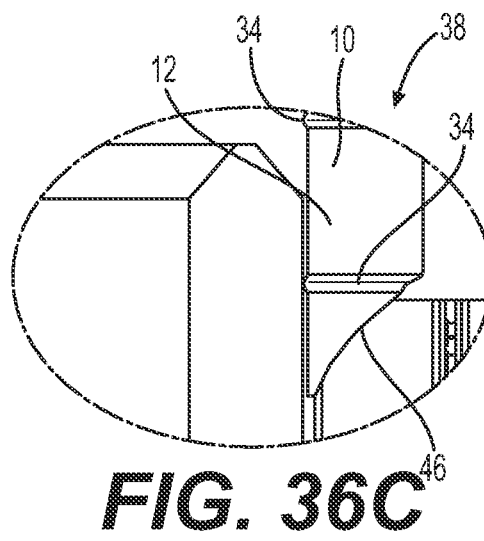
FIG. 36C is showing a front elevation detailed view of a ribbed aerodynamic skirt including a rib in contact with a foreign object, in accordance with principles and embodiments of the present invention.

Moving now to FIG. 36A depicting a trailer 18 equipped with a skirt panel 10 contacting an external object 290, in the present situation, embodied as a road barrier. FIG. 36B and FIG. 36C are illustrating a typical contact between one of the ribs 34 of the skirt panel 10. It can be appreciated the rib 34 is preventing the surface 12 of the skirt panel 10 to contact the external object 290 thus preventing damaging the large surface 12 of the skirt panel 10 limiting possible damages to the ribs 34. The ribs 34 has therefore a protection role in addition with the other functions described above.

Figure 37:
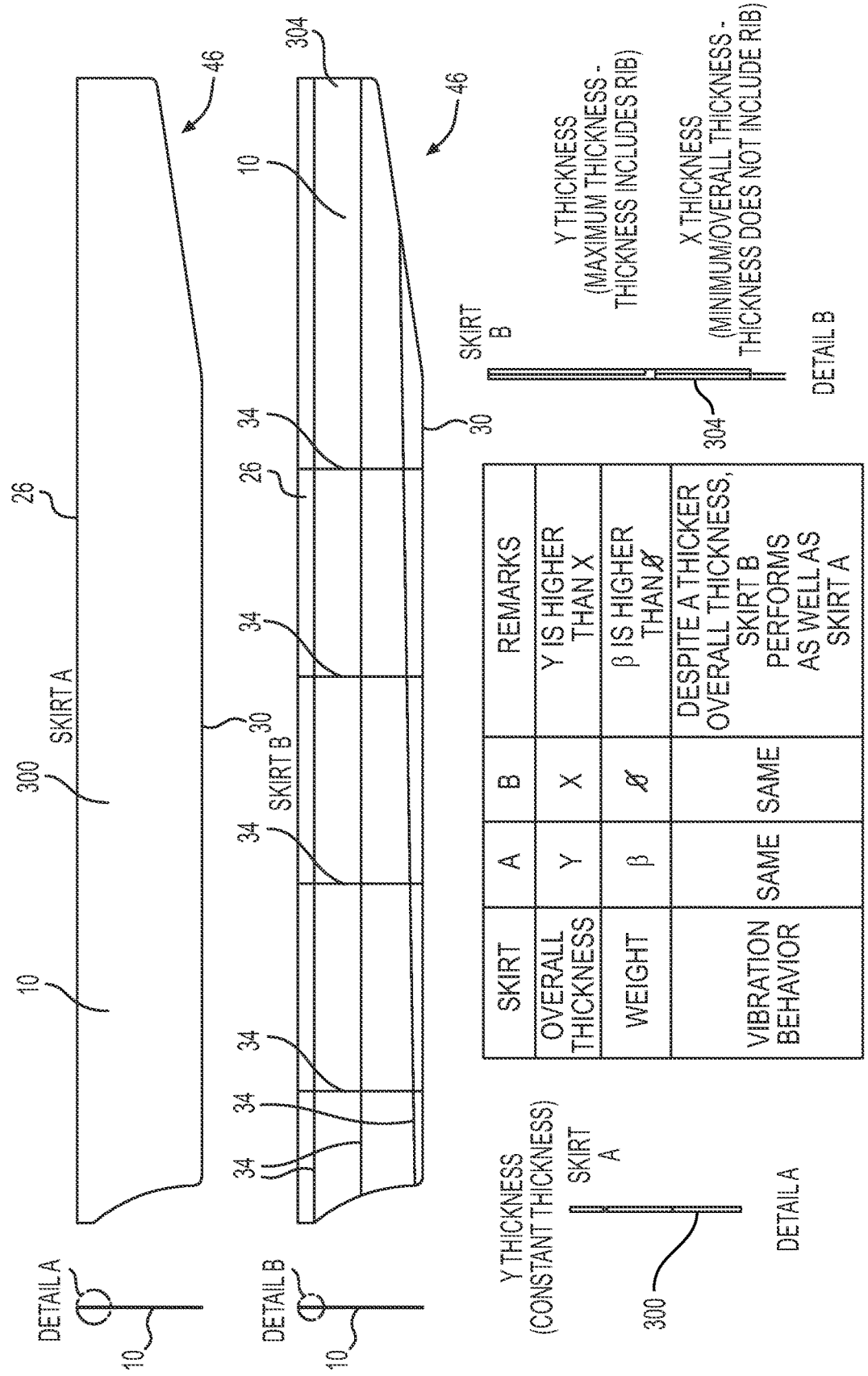
FIG. 37 is showing a table describing features of skirt panels and depicting side elevation views of a planar and a ribbed aerodynamic skirt including a plurality of thicknesses, in accordance with principles and embodiments of the present invention.

The skirt panel 10 can include thickness variations as expressed in the table illustrated in FIG. 37. Skirt panel 10 A includes a constant thickness 300 and skirt panel 10 B includes a variable thickness 304. The variable thickness 304 skirt panel 10 can be embodied with the exemplified parameters described in FIG. 37.

Figure 38:
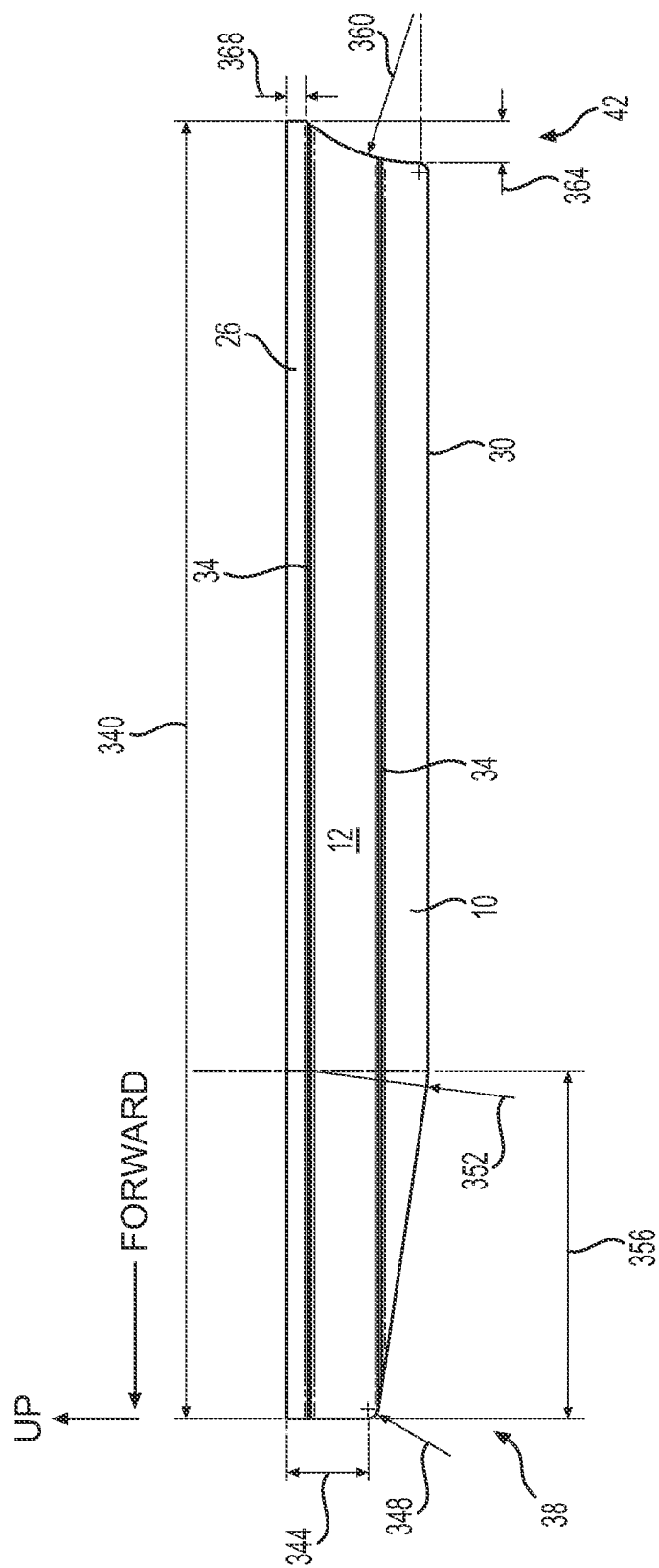
FIG. 38 is showing a left side elevation view of a ribbed aerodynamic skirt including a plurality of ribs with the convex profile adapted to be proximally disposed on the vehicle in accordance with principles and embodiments of the present invention.

An illustrative skirt panel 10 is shown in FIG. 38. The illustrated skirt panel 10 has a length 340 of about 700 centimeters, a forward portion 38 height 344 of about 44 centimeters, a front radius of curvature 348 of about 5 centimeters, an intermediate radius of curvature 352 of about 63.5 centimeters, a forward portion length 356 of about 183 centimeters, a rear radius 360 of about 96.5 centimeters, a rear contour 364 having a longitudinal length of about 23 centimeters and a top height 368 of about 10 centimeters. These dimensions are for illustrative purposes and can be adapted to match the requirements for applications on vehicles of various sizes and configurations. In the present situation, the forward height 344 can change between about 76 centimeters and about 81.3 centimeters for a "high skirt". Length 340 can vary substantially, illustratively from about 305 centimeters to about 915 centimeters. The skirt panel 10 can be embodied as a "short skirt" of illustratively about 336 centimeters and about 397 centimeters and generally don't have a slope at the bottom of their front portion, but rather only a radius of about 13 centimeters. The designs and dimensions provided above are for illustrative purposes and alternative lengths, configurations and layouts desirable to provide a ribbed skirt panel 10 in accordance with the present invention to match other trailer's 18 layouts remain within the scope of the present description.

Figure 39:
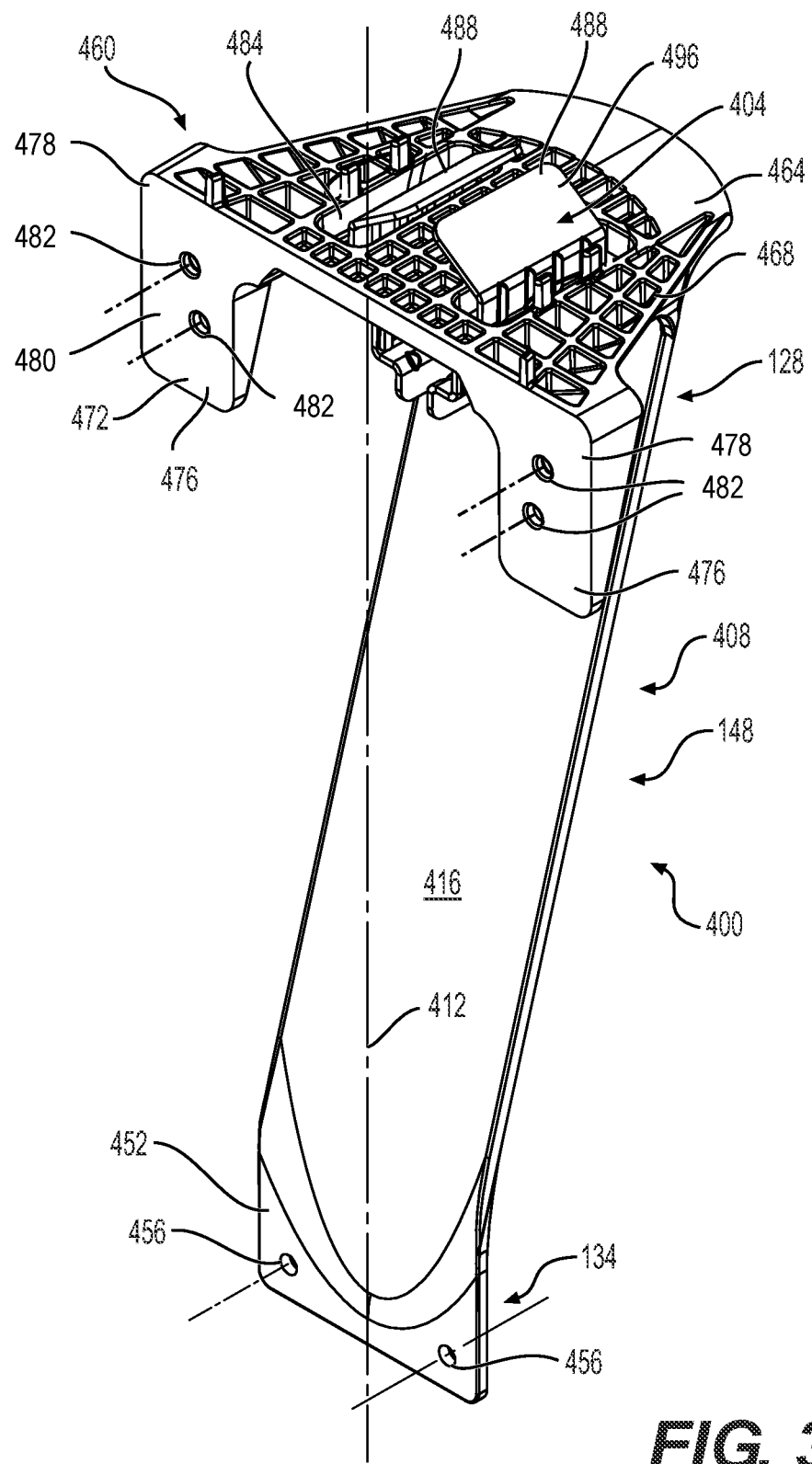
FIG. 39 is a perspective view of a support bracket, in accordance with principles and embodiments of the present invention.
Figure 40:
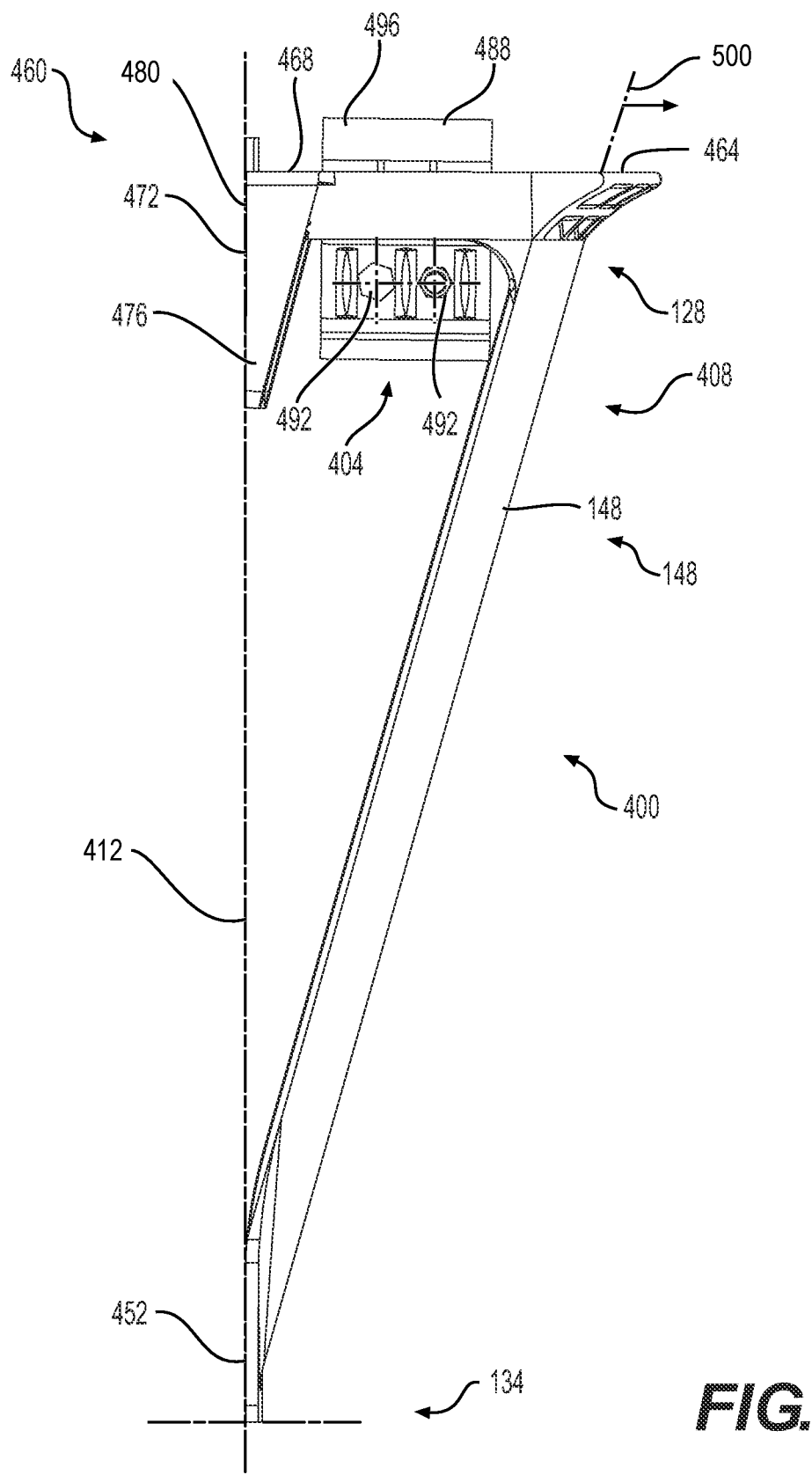
FIG. 40 is a front elevation view of the support bracket of FIG. 39, in accordance with principles and embodiments of the present invention.

FIG. 39 and FIG. 40 are illustrating a securing mechanism 400 including a connector portion 404 and a strut portion 408 both centered along vertical axis 412. The strut portion 408 includes a strut member 416, with the concave flexible member 148 thereof, securing the skirt panel 10 to the lower portion 134 thereof. In the illustrated embodiment, a planar section 452 includes holes 456 therein for securing the lower portion 134 of the skirt panel 10 with fasteners or rivets, for example. The strut portion 408 includes a securing portion 460 to which is connected the strut portion 408. The securing portion 460 includes a stabilizer 464, a trailer contacting portion 468, a skirt panel contacting portion 472 and a pair of securing wings 476. The stabilizer 464 is located proximal to the longitudinal direction 22 of the trailer 18 when installed on a trailer 18, proximally extending from a projection 500 of the flexible member 148 to create a lever that help sustains the loads applied on the strut portion 408 by the skirt panel 10. The skirt panel contacting portion 472 includes a planar section 478 provided with a series of holes 482 therein for securing the upper portion 128 of the skirt panel 10 with fasteners or rivets, for example. Both planar section 452, 476 are preferably aligned along a unique vertical plane 480 coplanar with the vertical axis 412 for efficiently contacting the skirt panel 10. The trailer contacting portion 468 includes openings 484 therein to receive therein the connector portion 404 for securing the strut portion 408 to the trailer 18.

The connector portion 404 is embodied as two opposed clamps 488 configured to be secured together with, for instance, two fasteners 492. The two opposed clamps 488 are securing together the trailer contacting portion 468 of the strut portion 408 with a lower portion of an I-beam of the trailer floor 16. Each clamp 488 uses an inclined member 496 and two contacting portions for securing the connector portion 404 with the I-beam of the trailer floor 16.

Figure 41:
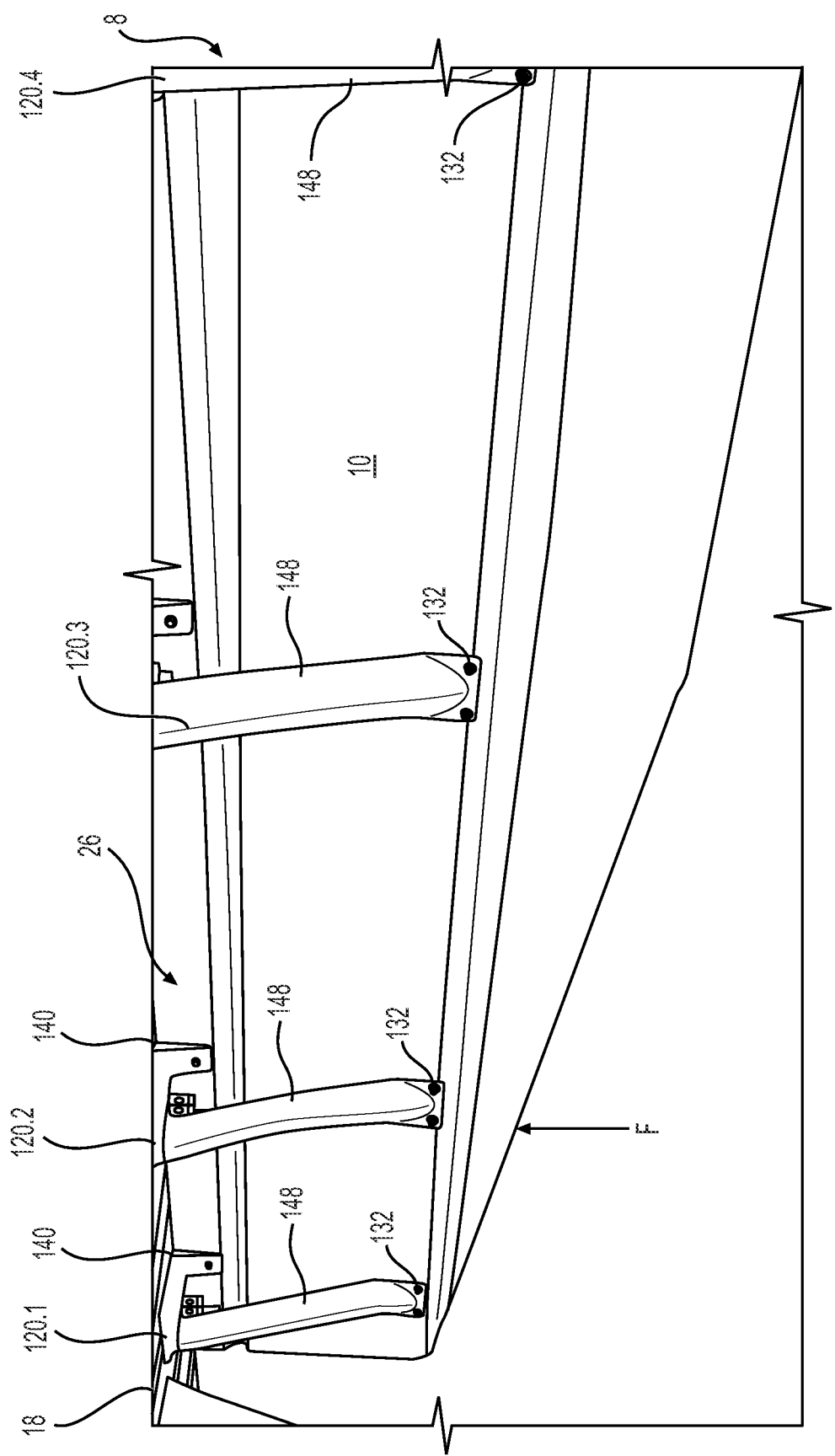
FIG. 41 is a perspective view of the skirt assembly, taken from the underside of a trailer, with a small force applied thereon, in accordance with principles and embodiments of the present invention.
Figure 42:
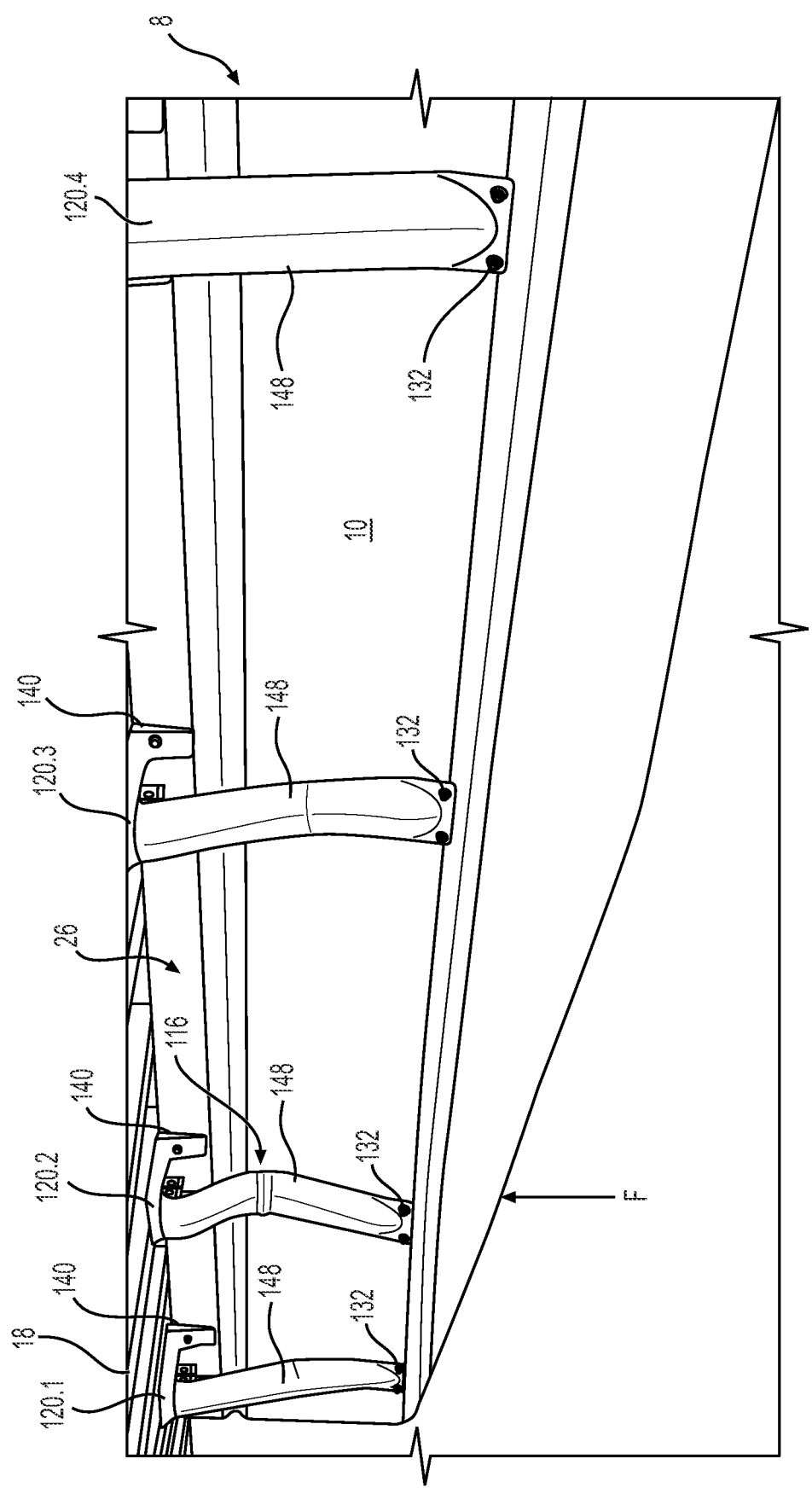
FIG. 42 is a Figure perspective view of the skirt assembly, taken from the underside of a trailer, with a medium force applied thereon, in accordance with principles and embodiments of the present invention.
Figure 43:
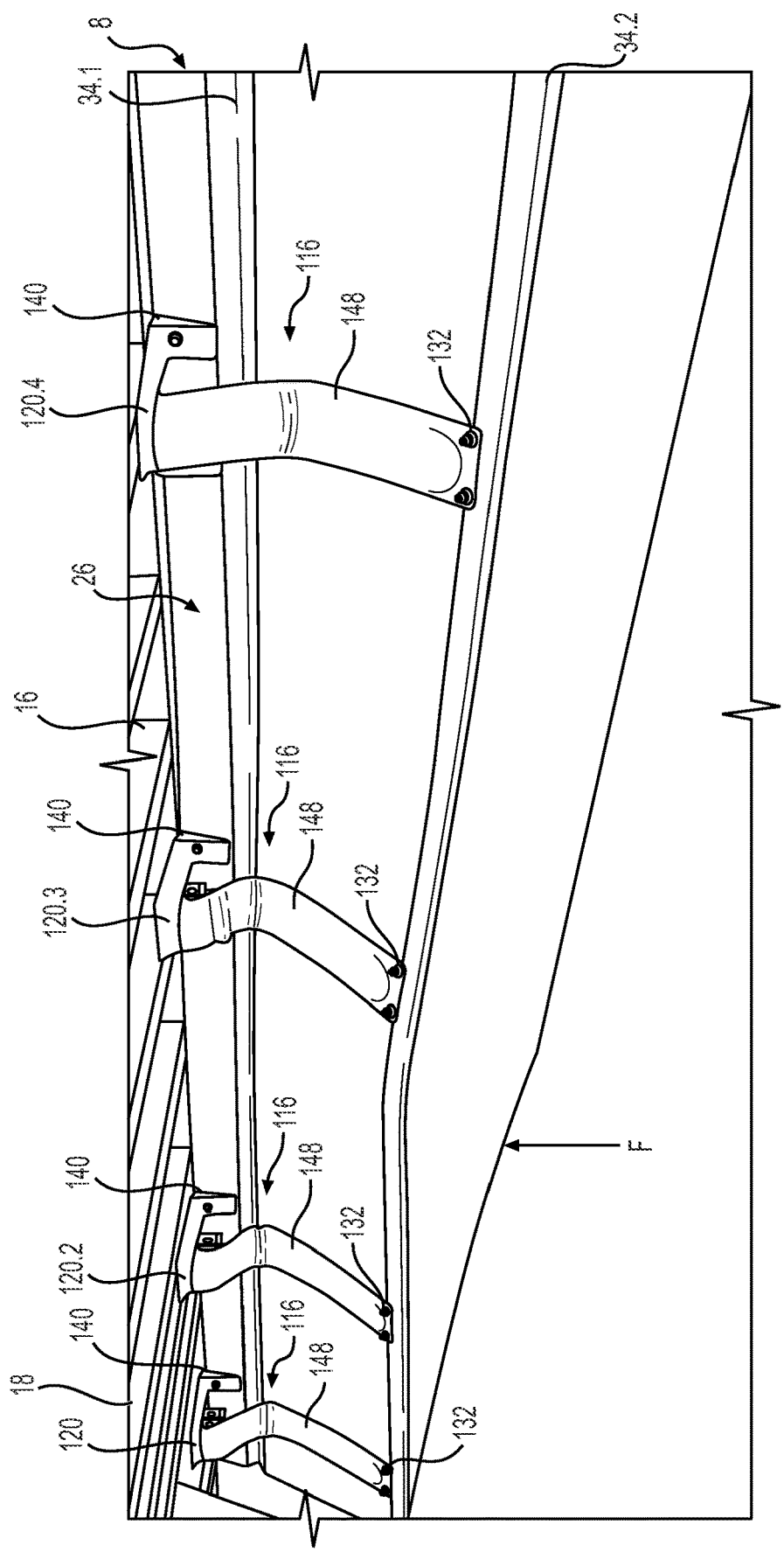
FIG. 43 is a perspective view of the skirt assembly, taken from the underside of a trailer, with a large force applied thereon, in accordance with principles and embodiments of the present invention.
Figure 44:
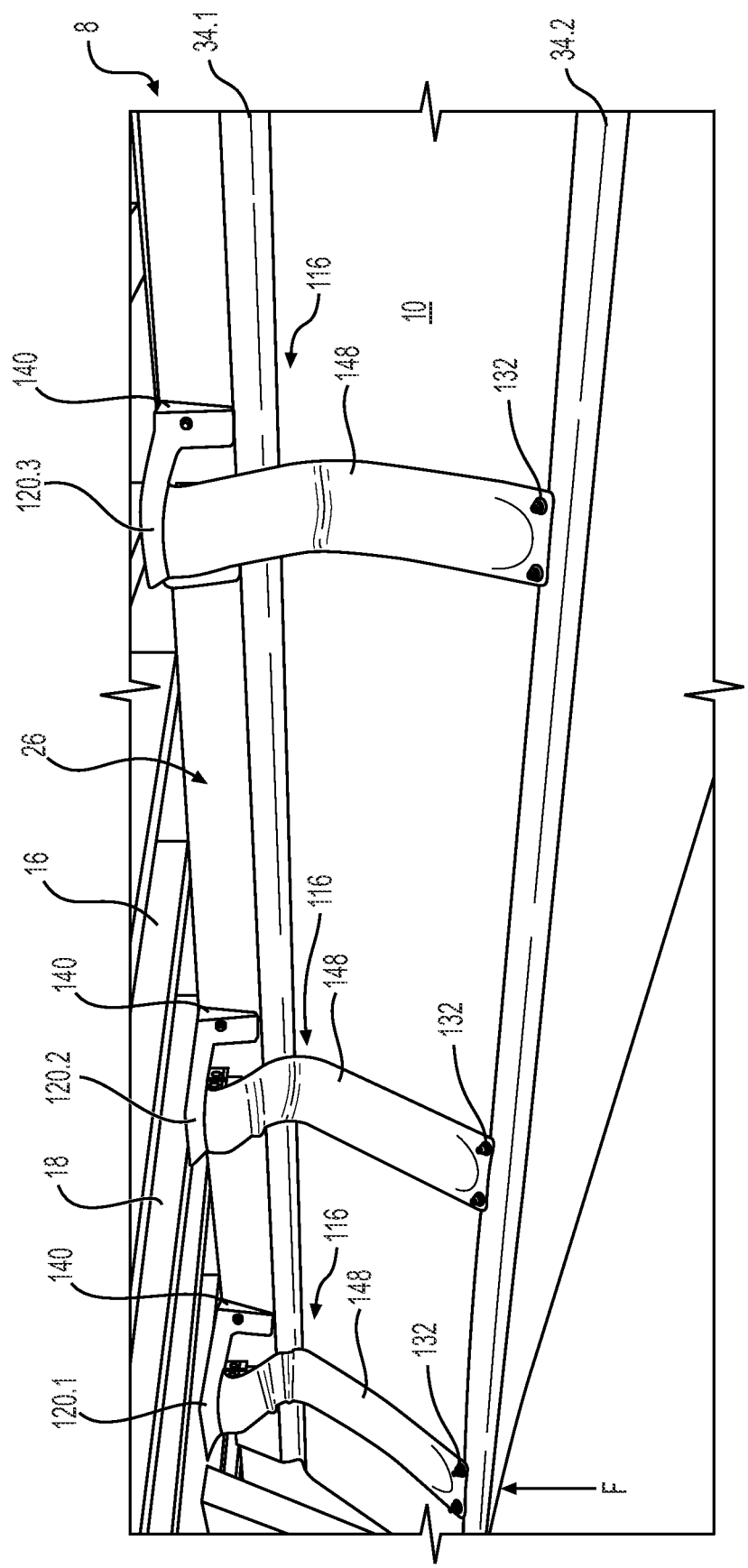
FIG. 44 is a perspective view of the skirt assembly, taken from the underside of a trailer, with a larger force applied thereon, in accordance with principles and embodiments of the present invention.
Figure 45:
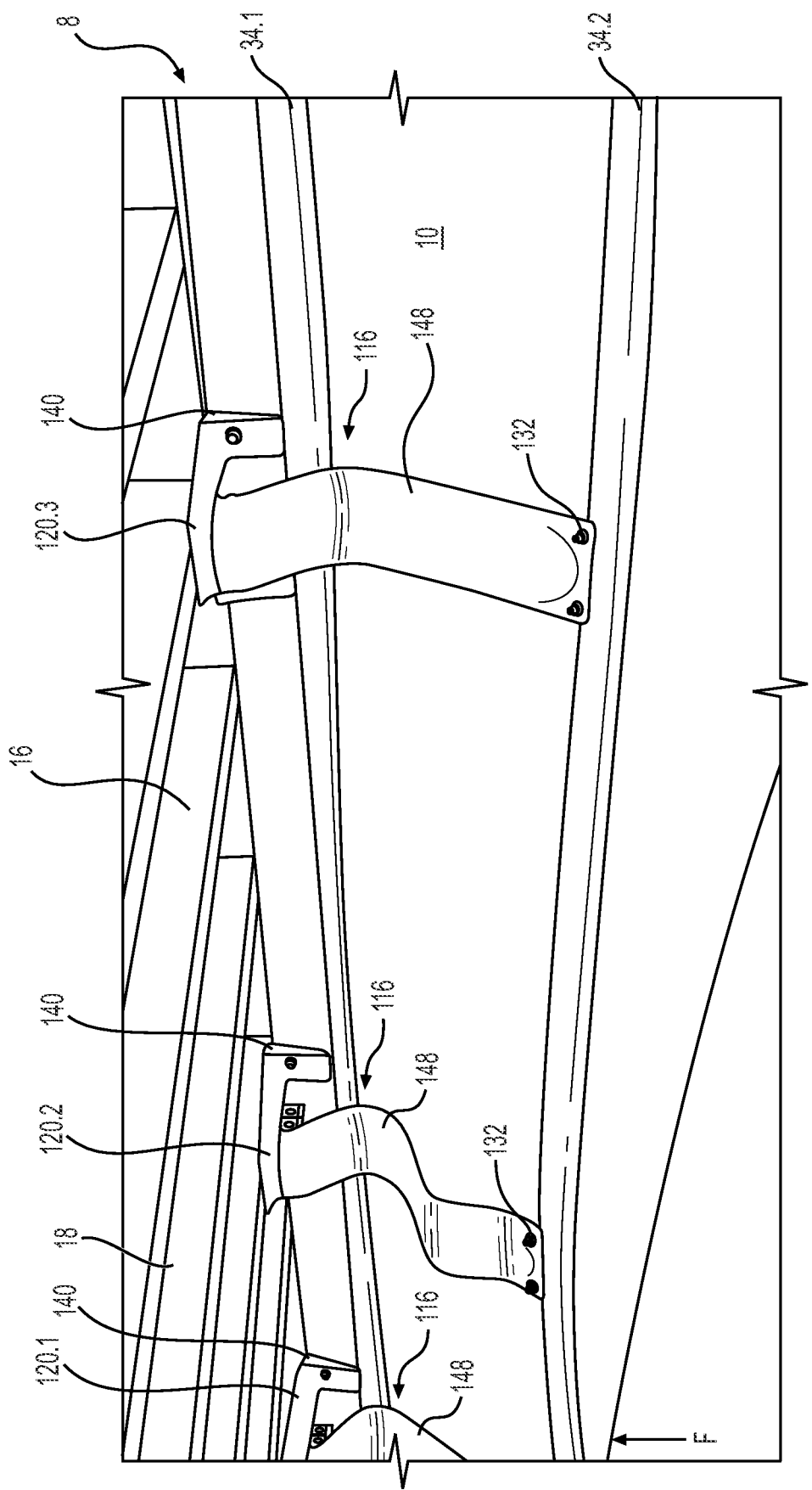
FIG. 45 is a perspective view of the skirt assembly, taken from the underside of a trailer, with a further larger force applied thereon, in accordance with principles and embodiments of the present invention.

FIG. 41 throughout FIG. 45 are showing an aerodynamic skirt assembly 8 with the skirt panel 10 secured to the trailer 18 with a plurality of support brackets 120. A force F is progressively applied to the skirt panel 10 from FIG. 41, illustrating a small force deforming slightly the skirt panel 10 and the second support bracket 120.2 from the left. Force F is increased in FIG. 40 buckling 116 support bracket 120.2 and beginning to buckle support brackets 120.1, 120.3. Further increasing force F, one can appreciate from FIG. 41 all support brackets are deformed and buckled 116. FIG. 42 is showing a more pronounced deformation of the skirt panel 10 with a stronger force F. Force F is even further increased in FIG. 43, the deformation of the skirt panel 10 is greater and support bracket 120.2 is more deformed and may be buckling under a different mode, therefore buckling, for instance, at two distinct locations along the flexible member 148. The progressive skirt panel 10 deformation caused by the exemplary increasing force F illustrated in FIG. 39 throughout FIG. 43 is bending the skirt panel 10 in a vertical direction and in a lateral direction, proximally in the illustrative example. The ribs 34.1, 34.2 are increasing the longitudinal stiffness of the skirt panel 10 although allowing two dimensional deformations of the skirt panel 10. The skirt panel 10 is also deforming along the longitudinal direction given the deformations in the two other directions although the ribs 34.1, 34.2 are limiting the deformation in the longitudinal direction. It is also shown the flexible member 148 of the deformed support bracket 120 is contacting the skirt panel 10 with a portion of the flexible member 148 following the shape of the skirt panel 10.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior Art.

What is claimed is:

1. An aerodynamic skirt assembly comprising:
a pair of ribbed skirt panels each adapted to be mounted to respective longitudinal sides of a trailer, each ribbed skirt panel being constructed with a material and design allowing a substantial elastic deformation thereof without recording substantial plastic deformation thereof, each skirt panel including
a pair of parallel surfaces;
a forward portion and a rearward portion, the forward portion being adapted to be mounted toward a forward portion of the trailer and the rearward portion being adapted to be mounted toward a rearward portion of the trailer in a skirt panel aerodynamic configuration adapted to reduce air drag about the trailer when the trailer is in movement, each ribbed skirt panel being adapted to independently move away from the skirt panel aerodynamic configuration as a consequence of an external force caused by a physical contact between the skirt panel and an object not associated with the aerodynamic skirt assembly and the trailer to a visibly altered position detrimental to the air drag reduction obtained when the skirt panel is in the skirt panel aerodynamic configuration, and to self-recover the skirt panel aerodynamic configuration when the ribbed skirt panel is not in physical contact anymore with the object, for regaining the air drag reduction obtained when the ribbed skirt panel is in the skirt panel aerodynamic configuration,
each of the pair of ribbed skirt panel including a rib extending over one of the surfaces for increasing the moment of inertia of the ribbed skirt panel,
the aerodynamic skirt assembly further comprising a plurality of struts associated with each ribbed skirt panel and adapted to secure the ribbed skirt panel to the trailer, each strut comprising a skirt connecting portion, adapted to be secured to the ribbed skirt panel, and a trailer connecting portion, adapted to be secured to the trailer, each strut being flexible to accommodate relative movements between the skirt connecting portion and the trailer connecting portion, each strut being constructed with a material allowing a substantial elastic deformation thereof without recording substantial plastic deformation thereof when the strut is deforming from a default strut configuration when a force is applied thereon by the ribbed skirt panel moving away the ribbed skirt panel from the skirt panel aerodynamic configuration as a result of the external force, and to self-recover the default strut configuration when the skirt panel is not sustaining the external force anymore, which allows the strut to move away from the default strut configuration and hold the ribbed skirt panel away from the skirt panel aerodynamic configuration in the visibly altered position detrimental to the air drag reduction obtained when the ribbed skirt panel is in the skirt panel aerodynamic configuration, and to self-recover the default strut configuration when the ribbed skirt panel is not sustaining the external force anymore, for recovering the air drag reduction obtained when the ribbed skirt panel is in the skirt panel aerodynamic configuration.

2. The aerodynamic skirt assembly of claim 1, wherein the rib is longitudinally extending between the forward portion and the rearward portion of the ribbed skirt panel.

3. The aerodynamic skirt assembly of claim 1, wherein the rib is a plurality of ribs disposed parallel to each other.

4. The aerodynamic skirt assembly of claim 1, wherein the rib is a plurality of ribs disposed non-parallel to each other.

5. The aerodynamic skirt assembly of claim 1, wherein the rib is formed in the ribbed skirt panel.

6. The aerodynamic skirt assembly of claim 1, wherein the rib includes a "U" shape or a "V" shape.

7. The aerodynamic skirt assembly of claim 1, wherein the rib includes a substantially constant profile there along.

8. The aerodynamic skirt assembly of claim 1, wherein the rib includes a non-constant profile there along.

9. The aerodynamic skirt assembly of claim 1, wherein the rib is modifying a natural vibration frequency of the ribbed skirt panel.

10. The aerodynamic skirt assembly of claim 1, wherein the rib is separate from the ribbed skirt panel and secured to the one of the parallel surfaces of the ribbed skirt panel.

11. An aerodynamic ribbed skirt panel adapted to be mounted to a longitudinal side of a trailer, the ribbed skirt panel being constructed with a material allowing a substantial elastic deformation thereof without recording substantial plastic deformation thereof, the ribbed skirt panel comprising:
a pair of parallel surfaces;
a forward portion and a rearward portion, the forward portion being adapted to be mounted toward a forward portion of the trailer and the rearward portion being adapted to be mounted toward a rearward portion of the trailer in a skirt panel aerodynamic configuration adapted to improve aerodynamics of the trailer when the trailer is in movement, the ribbed skirt panel being adapted to independently move away from the skirt panel aerodynamic configuration as a consequence of an external force caused by a physical contact between the ribbed skirt panel and an object not associated with an aerodynamic skirt assembly and the trailer to a visibly altered position detrimental to the air drag reduction obtained when the ribbed skirt panel is in the skirt panel aerodynamic configuration, and to self-recover the original skirt panel aerodynamic configuration when the ribbed skirt panel is not in physical contact anymore with the object, for regaining the air drag reduction obtained when the ribbed skirt panel is in the skirt panel aerodynamic configuration, the ribbed skirt panels including a rib extending over one of the surfaces for increasing the moment of inertia of the ribbed skirt panel.

12. The ribbed aerodynamic skirt panel of claim 11, wherein the rib is longitudinally extending between the forward portion and the rearward portion of the ribbed skirt panel.

13. The ribbed aerodynamic skirt panel of claim 11, wherein the rib is a plurality of ribs disposed parallel to each other.

14. The ribbed aerodynamic skirt panel of claim 11, wherein the rib is a plurality of ribs disposed non-parallel to each other.

15. The ribbed aerodynamic skirt panel of claim 11, wherein the rib is formed in the ribbed skirt panel.

16. The ribbed aerodynamic skirt panel of claim 11, wherein the rib includes a "U" shape or a "V" shape.

17. The ribbed aerodynamic skirt panel of claim 11, wherein the rib includes a substantially constant profile there along.

18. The ribbed aerodynamic skirt panel of claim 11, wherein the rib includes a non-constant profile there along.

19. The ribbed aerodynamic skirt panel of claim 11, wherein the rib is modifying a natural vibration frequency of the ribbed skirt panel.

20. The ribbed aerodynamic skirt panel of claim 11, wherein the rib is separate from the ribbed skirt panel and secured to the one of the parallel surfaces of the ribbed skirt panel.

\* \* \* \* \*